United States Patent
Wu et al.

(10) Patent No.: US 11,616,626 B2
(45) Date of Patent: Mar. 28, 2023

(54) TRANSPORT BLOCK SIZE DETERMINATION FOR SIDELINK COMMUNICATIONS

(71) Applicant: QUALCOMM Incorporated, San Diego, CA (US)

(72) Inventors: Shuanshuan Wu, San Diego, CA (US); Kapil Gulati, Belle Mead, NJ (US); Gabi Sarkis, San Diego, CA (US); Sudhir Kumar Baghel, Hillsborough, NJ (US)

(73) Assignee: QUALCOMM Incorporated, San Diego, CA (US)

(*) Notice: Subject to any disclaimer, the term of this patent is extended or adjusted under 35 U.S.C. 154(b) by 86 days.

(21) Appl. No.: 17/165,140

(22) Filed: Feb. 2, 2021

(65) Prior Publication Data

US 2021/0250150 A1 Aug. 12, 2021

Related U.S. Application Data

(60) Provisional application No. 62/975,698, filed on Feb. 12, 2020.

(51) Int. Cl.
*H04L 5/00* (2006.01)
*H04W 72/04* (2009.01)
(Continued)

(52) U.S. Cl.
CPC .......... *H04L 5/0053* (2013.01); *H04L 1/0003* (2013.01); *H04L 5/0007* (2013.01); *H04W 72/0446* (2013.01)

(58) Field of Classification Search
CPC ....... H04L 5/0053; H04L 1/003; H04L 5/007; H04L 5/0091; H04L 1/0023;
(Continued)

(56) References Cited

U.S. PATENT DOCUMENTS

2020/0037343 A1 1/2020 He et al.
2020/0166580 A1\* 5/2020 Jung ...................... G01R 31/36
(Continued)

FOREIGN PATENT DOCUMENTS

CN 111867095 \* 10/2020 ........ H04W 72/0446
EP 3621226 \* 9/2019 ............ H04W 72/14
(Continued)

OTHER PUBLICATIONS

Apple: "On NR V2X Physical Layer Structure", 3GPP TSG RAN WG1 #99, 3GPP Draft; R1-1912810, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019, Nov. 9, 2019 (Nov. 9, 2019), pp. 1-15, XP051823610, Retrieved from the Internet: URL: https://ftp.3gpp.org/tsg_ran/WG1_RL1/TSGR1_99/Docs/R1-1912810. zip R1-1912810 On NR V2X Physical Layer Structure.docx [retrieved on Nov. 9, 2019] Sections 2.1-2.6, section 2.7.
(Continued)

*Primary Examiner* — Diane L Lo
*Assistant Examiner* — Abusayeed M Haque
(74) *Attorney, Agent, or Firm* — Holland & Hart LLP

(57) ABSTRACT

Methods, systems, and devices for sidelink wireless communications are described in which a transmitting device may determine a transport block size (TBS) for a sidelink data channel transmission and provide an indication in in sidelink control information (SCI) to allow a receiving device to determine the TBS to be used for decoding the sidelink communication. The indication provided in the SCI may be an explicit indication in an information element that indicates whether feedback channel resources are included or excluded when determining a number of symbols for use in a TBS determination. The indication provided in the SCI may also be an implicit indication based on one or more
(Continued)

values of one or more parameters provided in the SCI. The sidelink communications devices may determine a same TBS across multiple instances of a sidelink data channel transmission that may be transmitted using slots having different slot formats.

43 Claims, 12 Drawing Sheets

(51) Int. Cl.
*H04W 92/18* (2009.01)
*H04L 1/00* (2006.01)
*H04W 72/0446* (2023.01)

(58) Field of Classification Search
CPC . H04W 72/0446; H04W 72/02; H04W 92/18; H04W 72/0406
See application file for complete search history.

(56) References Cited

U.S. PATENT DOCUMENTS

| | | | | |
|---|---|---|---|---|
| 2020/0404624 | A1 | 12/2020 | Roth et al. | |
| 2022/0070876 | A1* | 3/2022 | Bangolae | H04W 24/08 |
| 2022/0078825 | A1* | 3/2022 | Davydov | H04L 5/0044 |
| 2022/0095260 | A1* | 3/2022 | Shan | H04W 60/04 |
| 2022/0116089 | A1* | 4/2022 | Khoryaev | H04B 7/0695 |
| 2022/0140881 | A1* | 5/2022 | Zhang | H04W 76/19 |
| | | | | 370/329 |
| 2022/0141694 | A1* | 5/2022 | Miao | H04B 17/345 |
| | | | | 370/252 |
| 2022/0141719 | A1* | 5/2022 | Shan | H04W 36/0055 |
| | | | | 370/331 |
| 2022/0159501 | A1* | 5/2022 | Chou | H04L 41/122 |
| 2022/0166580 | A1* | 5/2022 | Zhu | H04L 27/2613 |
| 2022/0182120 | A1* | 6/2022 | Sergeev | H04B 7/0634 |

FOREIGN PATENT DOCUMENTS

| | | | | |
|---|---|---|---|---|
| EP | 3621226 | A1 * | 3/2020 | ............ H04J 13/102 |
| WO | WO-2020017885 | A1 | 1/2020 | |
| WO | WO-2020060890 | A1 * | 3/2020 | ........ H04W 52/0216 |
| WO | WO-2021017920 | A1 | 2/2021 | |
| WO | WO-2021029124 | A1 | 2/2021 | |
| WO | WO-2021102830 | A1 | 6/2021 | |

OTHER PUBLICATIONS

Ericsson: "Physical Layer Structure for NR Sidelink," 3GPP Draft; 3GPP TSG-RAN WG1 Meeting #101-e, R1-2004542, 3rd Generation Partnership Project (3GPP), Mobile Competence Centre; 650, Route Des Lucioles; F-06921, Sophia-Antipolis Cedex; France, vol. RAN WG1, No. e-Meeting; May 25, 2020-Jun. 5, 2020, May 15, 2020 (May 15, 2020), XP051886261, 4 pages, Retrieved from the Internet: URL: https://ftp.3gpp.org/tsg_ran/WG1_RL1/TSGR1_101-e/Docs/R1-2004542.zip R1-2004542 Ericsson—Physical layer structure for NR sidelink.docx [retrieved on May 15, 2020] section 4.
Intel Corporation: "Sidelink Physical Layer Procedures for NR V2X Communication," 3GPP Draft, 3GPP TSG RAN WG1 Meeting #98bis, R1-1910653 Intel—EV2X SL L1 Procedure, 3rd Generation Partnership Project (3GPP), Mobile Competence Centre; 650, Route Des Lucioles; F-06921, Sophia-Antipolis Cedex; France, vol. RAN WG1, No. Chongqing, China, Oct. 14, 2019-Oct. 20, 2019, Oct. 8, 2019 (Oct. 8, 2019), XP051789445, 10 pages, Retrieved from the Internet: URL: http://www.3gpp.org/ftp/tsg_ran/WG1_RL1/TSGR1_98b/Docs/R1-1910653.zip [retrieved on Oct. 8, 2019] section 2.3.1.
Intel Corporation: "Sidelink Physical Structure for NR V2X Communication", 3GPP Draft, 3GPP TSG RAN WG1 Meeting #98bis, R1-1910648, 3rd Generation Partnership Project (3GPP), Mobile Competence Centre; 650, Route Des Lucioles; F-06921, Sophia-Antipolis Cedex; France, vol. RAN WG1, No. Chongqing, China; Oct. 14, 2019-Oct. 20, 2019, Oct. 8, 2019 (Oct. 8, 2019), XP051809168, 15 pages, Retrieved from the Internet: URL: https://ftp.3gpp.org/tsg_ran/WG1_RL1/TSGR1_98b/Docs/R1-1910648.zip R1-1910648.docx [retrieved on Oct. 8, 2019] section 4.3.
International Search Report and Written Opinion—PCT/US2021/016430—ISA/EPO—dated May 20, 2021.
Qualcomm Incorporated: "Considerations on Physical Layer Aspects of NR V2X," 3GPP Draft; 3GPP TSG RAN WG1 Meeting #101-e, R1-2004756, 3rd Generation Partnership Project (3GPP), Mobile Competence Centre; 650, Route Des Lucioles; F-06921, Sophia-Antipolis Cedex; France, vol. RAN WG1, No. May 25, 2020-Jun. 5, 2020, May 28, 2020 (May 28, 2020), XP051892050, 11 pages, Retrieved from the Internet: URL: https://ftp.3gpp.org/tsg_ran/WG1_RL1/TSGR1_101-e/Docs/R1-2004756.zip R1-2004756_Considerations on Physical Layer aspects of NR V2X.docx [retrieved on May 28, 2020] section 3.1.

* cited by examiner

TRANSPORT BLOCK SIZE DETERMINATION FOR SIDELINK COMMUNICATIONS

CROSS REFERENCE

The present Application for Patent claims the benefit of U.S. Provisional Patent Application No. 62/975,698 by WU et al., entitled "TRANSPORT BLOCK SIZE DETERMINATION FOR SIDELINK COMMUNICATIONS," filed Feb. 12, 2020, assigned to the assignee hereof.

FIELD OF TECHNOLOGY

The following relates generally to wireless communications and more specifically to transport block size determination for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support both access links and sidelinks. An access link is a communication link between a UE and a base station. In some examples, an access link may be referred to as a Uu interface. Specifically, the Uu interface may refer to an over-the-air interface for downlink transmissions, uplink transmissions, or both. A sidelink is a communication link between similar devices. For example, a sidelink may support communications between multiple UEs (e.g., in a vehicle-to-everything (V2X) system, a vehicle-to-vehicle (V2V) system, a device-to-device (D2D) system, among other examples). In some examples, a sidelink may support unicast messaging, groupcast messaging, multicast messaging, broadcast messaging, or combinations thereof. In some cases, repetitions of sidelink communications may be used to enhance the likelihood of successful reception of a sidelink message at a receiving device. In such systems, efficient and reliable techniques for receiving and decoding sidelink communications may be desirable.

SUMMARY

The described techniques relate to improved methods, systems, devices, and apparatuses that support transport block size (TBS) determination for sidelink communications. Various aspects of the present disclosure provide for a communication device, which may be a base station (e.g., eNodeB (eNBs), next-generation NodeB or giga-NodeB (any of which may be referred to as a gNB)) or a user equipment (UE) in a wireless communications system (e.g., a vehicle-to-everything (V2X) system, a vehicle-to-vehicle (V2V) network, a cellular V2X (C-V2X) network, a device-to-device (D2D) system, and the like) to determine TBSs for encoding and decoding of sidelink communications. In some cases, a transmitting device may determine a TBS for a sidelink communication (e.g., a sidelink data channel transmission) and provide sidelink control information (SCI) to a receiving device that indicates how the TBS is to be determined for decoding the sidelink communication. A receiving device may receive the SCI, and decode the sidelink communication using a TBS that is determined based on the indication provided in the SCI.

In some cases, the indication provided in the SCI may be an explicit indication (e.g., a dedicated parameter carried in SCI) that indicates whether sidelink feedback resources (e.g., physical sidelink feedback channel (PSFCH) resources) are included or excluded when determining a number of symbols for use in a TBS determination. In other cases, the indication provided in the SCI may be an implicit indication based on one or more values of one or more parameters provided in the SCI (e.g., one or more of a modulation and coding scheme (MCS) index, a coding rate, a modulation order, a channel data priority, or a transmission type, etc.). In some cases, the sidelink communication may include an initial sidelink data channel transmission and one or more repetitions of the sidelink data channel transmission, which may be transmitted using slots having different slot formats (e.g., in slots that include PSFCH resources and in slots that do not include PSFCH resources), where the determined TBS for the different slot formats may be consistent and thereby allow for efficient decoding of the multiple transmissions (e.g., through combining techniques at the receiving device). Devices operating in accordance with such techniques may, as a result, include features for improvements to communications reliability and efficiency, and in some examples may promote enhanced efficiency for high reliability and low latency operations, among other benefits.

DETAILED DESCRIPTION

Figure 1:
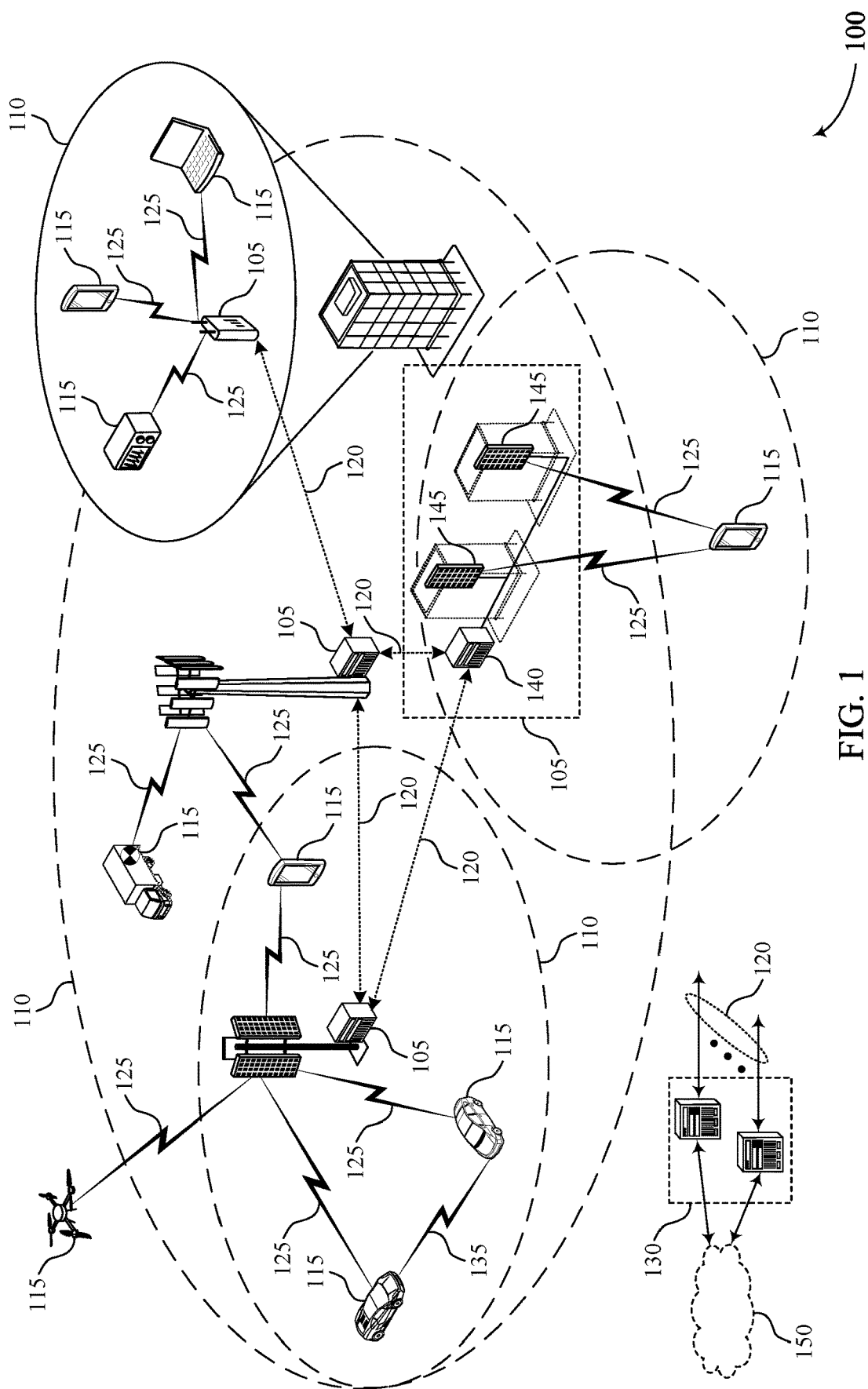
FIG. 1 illustrates an example of a system for wireless communications that supports transport block size determination for sidelink communications in accordance with aspects of the present disclosure.

A wireless communications system may support both access links and sidelinks for communications between one or more communication devices. An access link may refer to a communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

In some examples, sidelink communication may support feedback transmission. For example, in sidelink groupcast or multicast communications, one or more of the UEs may communicate hybrid automatic repeat request (HARQ) feedback to improve performance with the group. In sidelink unicast communications, a data receiver UE may transmit HARQ feedback so the data transmitter UE knows whether a packet has been successfully delivered. HARQ feedback may include a positive acknowledgment or a negative acknowledgement for sidelink communications, or both. Feedback may be provided in sidelink feedback resources, such as physical sidelink feedback channel (PSFCH) resources that may be configured in certain slots (e.g., every 1, 2, or 4 slots). When a slot has PSFCH resources configured, the orthogonal frequency division multiplexing (OFDM) symbols configured for PSFCH transmission will not be available for data channel (physical sidelink shared channel (PSSCH)) transmission. For instance in New Radio sidelink, feedback resources and associated gap(s) may occupy the last four OFDM symbols in a slot having PSFCH resource.

Further, in some cases, in order to enhance reliability, a transmitting UE may transmit multiple repetitions of a sidelink data channel transmission. For example, a UE communicating low latency and high reliability data may perform an initial sidelink data channel transmission followed by one or more repetitions of the sidelink data channel transmission. When encoding the sidelink data channel transmission, the transmitting UE may determine the TBS based on a slot format of a slot that is to carry the transmission by determining a number of OFDM symbols available for shared channel transmissions and then determining the TBS based on the number of OFDM symbols and a MCS of the transmission. However, in cases where different instances of a sidelink data channel transmission use slots having different slot formats, separately determining the TBS for each slot may result in different TBSs for different instances of the sidelink data channel transmission, which may prevent efficient decoding of the sidelink data channel transmission such as in cases where the receiving UE attempts to combine multiple instances of the transmission.

In various aspects, techniques discussed herein allow the transmitting UE and the receiving UE to identify TBS for a transmission and allow for efficient encoding and decoding of the transmission. In some cases, the transmitting UE may determine the TBS for a sidelink data channel transmission and provide an indication in SCI to allow the receiving UE to unambiguously determine the TBS to be used for decoding the sidelink communication. In some cases, the indication provided in the SCI may be an explicit indication (for example, a dedicated parameter in SCI) that indicates whether PSFCH resources are included or excluded when determining a number of symbols for use in a TBS determination. In other cases, the indication provided in the SCI may be an implicit indication based on one or more values of one or more parameters provided in the SCI (e.g., one or more of a MCS index, a coding rate, a modulation order, a channel data priority, or a transmission type). In such cases, the transmitting UE and receiving UE may determine a same TBS across multiple instances of a sidelink data channel transmission that may be transmitted using slots having different slot formats. Use of the same TBS for the different slot formats may thereby allow for efficient decoding of the transmission, or combining of multiple transmissions, at the receiving UE.

Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to reliability and efficiency in wireless operations. In some examples, the UEs may support high reliability through efficient decoding of one or more instances of a sidelink data channel transmission based on an unambiguous TBS determination at both the transmitting device and the receiving device. The described techniques may thus include features for improvements to reliability in communications, enhanced encoding and decoding efficiency, reduced power consumption (e.g., through reduced HARQ-based retransmissions), and, in some examples, may promote enhanced efficiency for high reliability and low latency operations, among other benefits.

Aspects of the disclosure are initially described in the context of wireless communications systems. Aspects of the disclosure are then illustrated by and described with reference to sidelink slot formats and a process flow that relate to TBS determination in sidelink communications. Aspects of the disclosure are further illustrated by and described with reference to apparatus diagrams, system diagrams, and flowcharts that relate to TBS determination for sidelink communications.

FIG. 1 illustrates an example of a wireless communications system 100 that supports TBS determination for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of T, =1/ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, sidelink communications may be enabled among devices in wireless communications system 100, such as between two or more UEs 115. In some cases, a transmitting UE 115 may determine the TBS for a sidelink data channel transmission and provide an indication in SCI to allow the receiving UE 115 to unambiguously determine the TBS to be used for decoding the sidelink communication. In some cases, the indication provided in the SCI may be an explicit indication in an information element that indicates whether PSFCH resources are included or excluded when determining a number of symbols for use in a TBS determination. In other cases, the indication provided in the SCI may be an implicit indication based on one or more values of one or more parameters provided in the SCI (e.g., one or more of a MCS index, a coding rate, a modulation order, a channel data priority, or a transmission type). In such cases, the sidelink UEs 115 may determine a same TBS across multiple instances of a sidelink data channel transmission that may be transmitted using slots having different slot formats.

Figure 2:
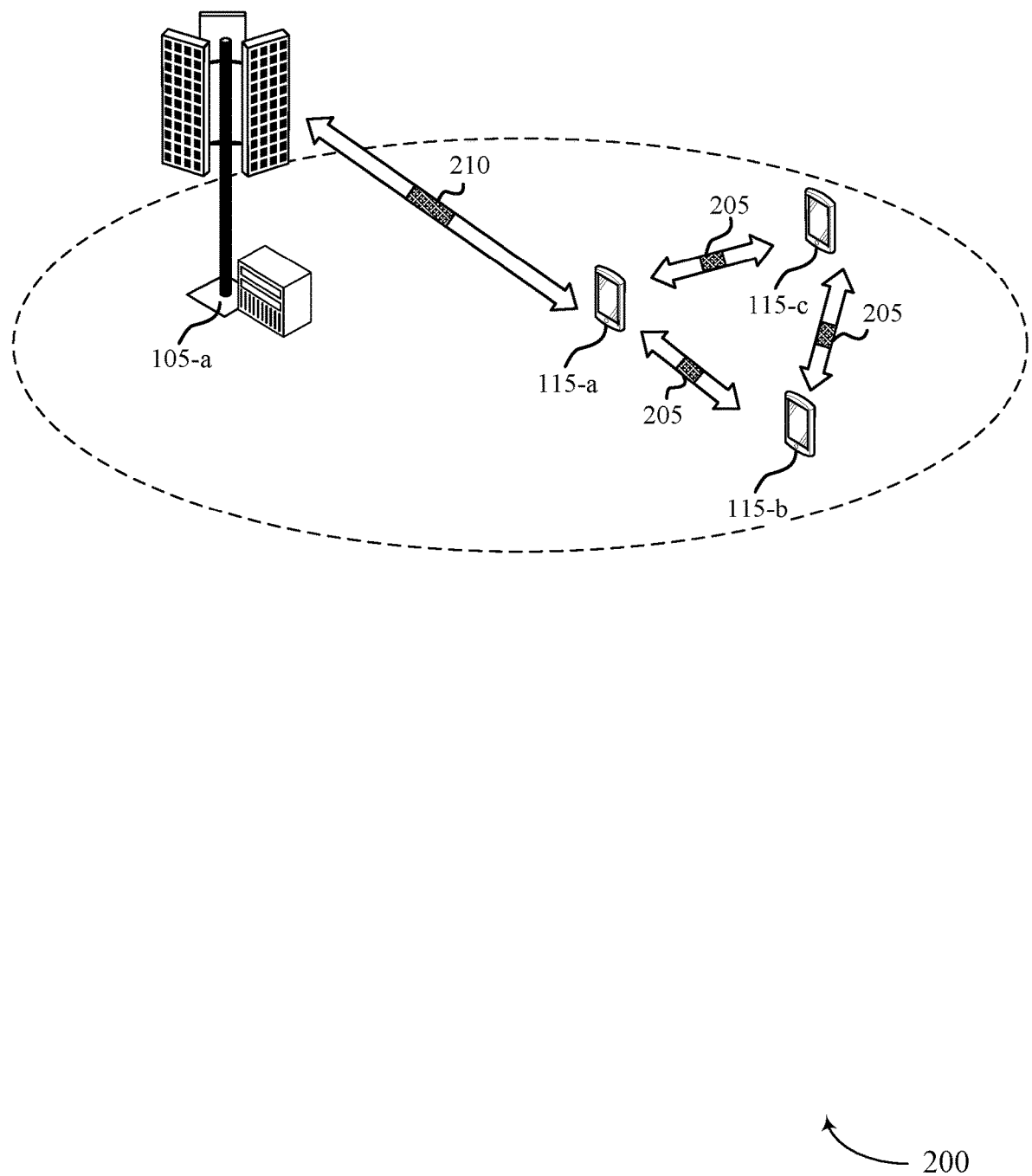
FIG. 2 illustrates an example of a wireless communications system that supports transport block size determination for sidelink communications in accordance with aspects of the present disclosure.

FIG. 2 illustrates an example of a wireless communications system 200 that supports TBS determination for sidelink communications in accordance with aspects of the present disclosure. In some examples, wireless communications system 200 may implement aspects of wireless communications system 100. In some examples, the wireless communications system 200 may implement aspects of the wireless communication system 100 and may include a base station 105-a and a group of UEs 115 (e.g., UE 115-a through UE 115-c), which may be examples of a base station 105 and UEs 115, respectively, described with reference to FIG. 1. In some cases, the group of UEs 115 may communicate with each other (e.g., within a V2X system, a D2D system, and the like) via sidelink communications.

According to some aspects, the group of UEs 115 may communicate with each other (or with another group of UEs 115) over sidelink communications 205 (e.g., using a peer-to-peer (P2P) or D2D protocol, such as a PC5 interface). For example, a UE 115-a may monitor resource pools for the sidelink communications 205 or indications of the sidelink communications 205 (e.g., resource reservations, control channel transmissions, among other examples) from other UEs 115 in the group. Additionally or alternatively, the UEs 115 may have data to transmit to one or more of the UEs 115 in the group and may use the sidelink communications 205 to transmit the data. In some examples, the group of UEs 115 may utilize sidelinks (e.g., the sidelink communications 205) in addition to access links with the base station 105.

For example, one or more of the UEs 115 may be in a coverage area (e.g., a coverage area 110 with reference to FIG. 1) of the base station 105. In such examples, a UE 115 may communicate with the base station 105 via a Uu interface (e.g., the base station 105 may transmit downlink communications to one or more of the UEs 115 via an access link 210). In some other examples, the group of UEs 115 may not be inside the coverage area or may not communicate with the base station 105 using an access link. In some cases, the UEs 115 may be configured with one or more resource pools for the sidelink communications 205.

In some cases, in order to enhance the reliability of sidelink communications 205, a transmitting UE 115 may transmit multiple instances of a sidelink transmission. For example, an initial transmission of sidelink data may be transmitted in a first slot, and a retransmission or repetition of the sidelink data transmission may be transmitted in a second slot. Further, in some cases the first slot and second slot may have a different slot format (e.g., due to the first slot including sidelink feedback resources and the second slot not including sidelink feedback resources). In such cases, the different slot formats may result in a different number of symbols being available for sidelink data. In some cases, the different number of symbols of the different slots may result in a different TBS computation for the different slots.

For example, transmitting and receiving UEs 115 may determine a number of available resources elements (REs) allocated for a data packet transmission, and then TBS is determined based on number of available REs and the MCS of the transmission. Further, both the transmitting and the receiving UEs 115 should follow the same rules for TBS determination, in order to provide for consistent encoding and decoding at the transmitting and receiving UEs 115. Additionally, in cases where multiple repetitions of a transmission are used in accordance with aspects of the present disclosure, a first transmission and a re-transmission also follow the same rule so the TBS is constant across multiple transmissions (e.g., to enable efficient decoding at the receiving UE 115, such as through soft buffering or combining techniques). Various aspects of the disclosure provide techniques for determination of TBS in the event that different slot formats are used for different instances of a sidelink transmission.

For example, the TBS determination may include a determination of the number of REs available for shared channel transmissions within a physical resource block (PRB) as:

$$N'_{RE} = N_{SC}^{RB} \cdot N_{symb}^{sh} - N_{DMRS}^{PRB} - N_{oh}^{PRB}$$

where $N_{SC}^{RB}=12$ is number of subcarriers in a PRB, $N_{symb}^{sh}$ is the number of allocated OFDM symbols for the shared channel (e.g., PSSCH), $N_{DMRS}^{PRB}$ is the number of REs for demodulation reference signal (DMRS) per PRB in the scheduled resources, $N_{oh}^{PRB}$ is an overhead value to be subtracted from the available REs (e.g., it may be configurable in {0, 6, 12, or 18}). Following the determination of the available REs, the UE 115 may determine the number of REs within the slot for the shared channel transmissions as $$N_{RE} = \min(144, N'_{RE}) \cdot n_{PRB},$$

where $n_{PRB}$ is total number of allocated or reserved PRBs for the shared channel transmission, 144 is the maximum number of available REs for shared channel in a PRB in sidelink (maximum number of available OFDM symbols is 12 in a sidelink slot). Then, the UE 115 may determine TBS based on the number of REs and MCS.

Figure 3:
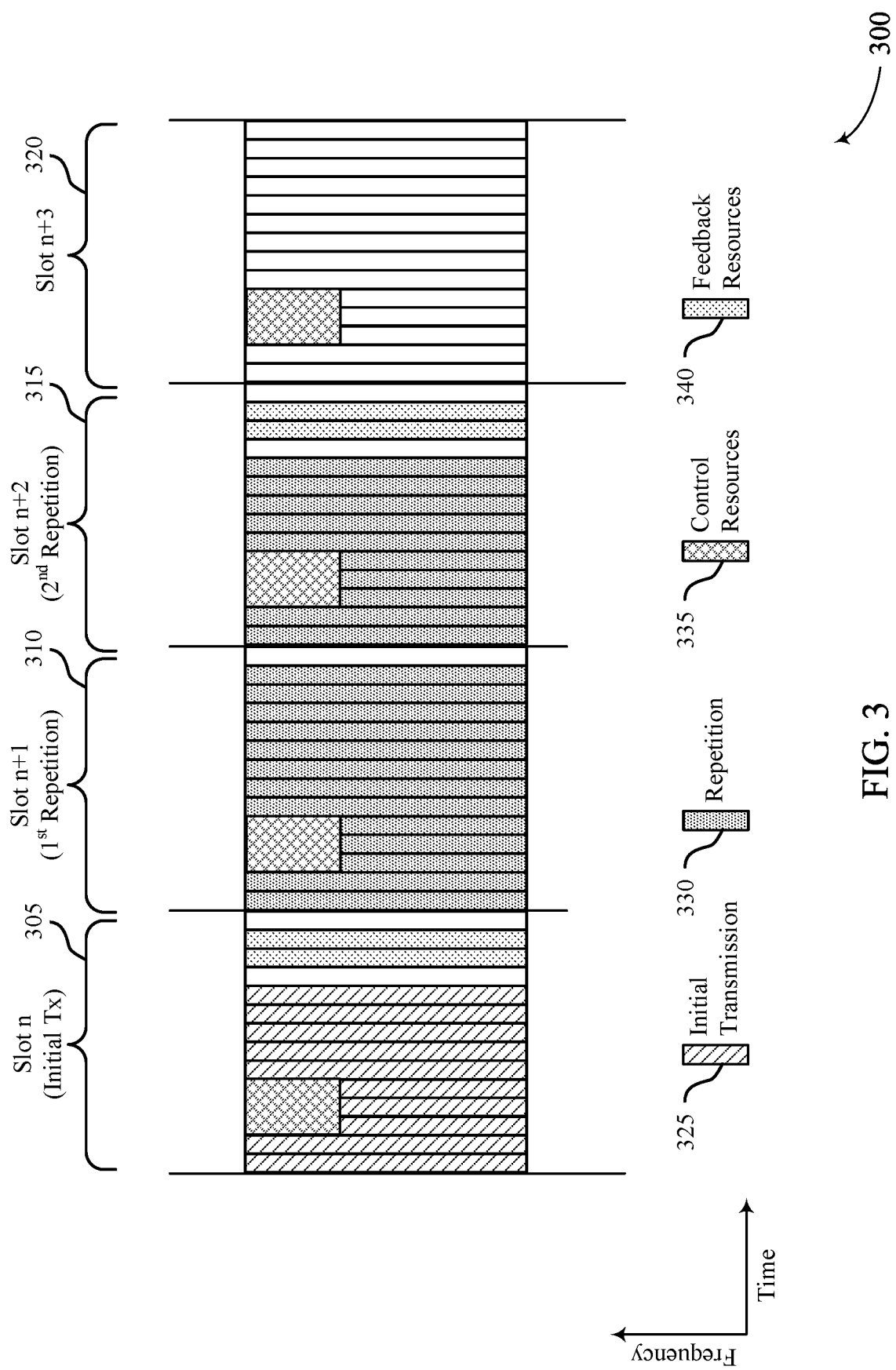
FIG. 3 illustrates an example of sidelink slot formats that supports transport block size determination for sidelink communications in accordance with aspects of the present disclosure.

As discussed herein, in cases where different instances of a shared channel transmission have different slot formats, such TBS determinations are then dependent upon the number of shared channel symbols of a slot. For example, a UE 115 may reserve resources in M transmission occasions (e.g., in M slots) for M transmissions of a TB (i.e., a first transmission and M−1 retransmissions of the TB). Further, slot formats may be different across the M slots (e.g., some slots may have a physical sidelink feedback channel (PSFCH) resource configured). Various aspects of the disclosure provide for consistent TBS determination in such cases, so the determined TBS is correct at receiving UEs 115 and constant across multiple transmissions, no matter whether there is PSFCH resource configuration in that slot or not. FIG. 3 illustrates an example of different slot formats in accordance with various aspects and sidelink data that may be transmitted in different slots.

FIG. 3 illustrates an example of sidelink slot formats 300 that support TBS determination for sidelink communications in accordance with aspects of the present disclosure. In some examples, sidelink slot formats 300 may implement aspects of wireless communications system 100 or 200. In some examples, the sidelink slot formats 300 may correspond to a resource grid, which may be a function of a frequency domain, as well as a time domain.

In the example of FIG. 3, the resource grid may include a number of slots n, such as slot (n) 305, slot (n+1) 310, slot (n+2) 315, and slot (n+3) 320. Each slot may include a number of time and frequency resources. For example, each slot n may have a number of symbols and subcarriers. In this example, slot (n) 305 may include an initial transmission 325 of a sidelink data transmission. Further, slot (n) 305 includes feedback resources 340 (e.g., PSFCH resources that may be configured in every 1/2/4 slots, with every 2 slots illustrated in this example) and thus sidelink shared channel resources do not occupy the last four symbols of the slot. A transmitting UE in this example may be configured to transmit two repetitions of the transmission, and in this example a first repetition 330 may be transmitted in slot (n+1) 310 and a second repetition 330 may be transmitted in slot (n+2) 315. In this example, slot (n+1) 310 may not have any feedback resources 340 configured, and thus has a different slot format than slot (n) 305 and slot (n+2) 315. In some cases, retransmissions may depend on HARQ feedback, and in other cases such as illustrated in FIG. 3, the retransmissions may provide blind repetitions 330 to improve reliability. A transmitting UE may reserve sidelink resources for retransmissions when transmitting the first/initial transmission 325. In other cases, the multiple transmissions may not be consecutive in time (i.e., they may be in non-consecutive slots).

In accordance with various aspects discussed herein, control resources 335 may include SCI that may include an indication of a slot format that is to be used to determine a TBS that applies across both the initial transmission 325 and repetitions 330 of the sidelink data transmission. In some cases, the SCI may explicitly or implicitly indicate whether sidelink feedback channel (e.g., PSFCH) resources are excluded for computation of the number of REs in TBS determination. In some cases, the number of OFDM symbols used for TBS determination is determined at least in part on an explicit signaling indication in SCI (e.g., a parameter with one or more bits in SCI indicates whether PSFCH resources are included or excluded for TBS determination). In other cases, the number of OFDM symbols used for TBS determination may be indicated implicitly in the SCI based on other information/parameters related to the sidelink data (e.g., PSSCH) transmission. Thus, in cases where PSFCH resources are excluded in TBS determination, the actual coding rate in a slot having PSFCH resource would be the same as (or similar to) nominal coding rate (i.e., the coding rate indicated by MCS), and the actual coding rate in a slot without PSFCH resources would be smaller than the nominal coding rate due to more actually available REs for PSSCH. Likewise, when the PSFCH resource is not excluded in TBS determination, the actual coding rate in a slot having PSFCH resources would be larger than the nominal coding rate due to less actually available REs for PSSCH, and the actual coding rate in a slot without PSFCH resources would be the same as or similar to the nominal coding rate indicated by MCS.

In cases where the SCI provides an explicit indication of whether feedback resources 340 are to be included or excluded in TBS determination, such an indication may be provided, for example, in a 1-bit parameter in SCI to indicate whether PSFCH resource is excluded. In some cases, the parameter may be carried in first stage SCI (e.g., via PSCCH), or in second stage SCI (e.g., via sidelink control information multiplexed in PSSCH). In some cases, a transmitting UE may determine whether feedback resources 340 should be excluded or not, and thus the value of the explicit indication in SCI, based on one or more rules (e.g., that may be preconfigured or configured when establishing the sidelink resource pool). In some cases, the transmitting UE may determine that feedback resources 340 are excluded in TBS determination if the slot for initial transmission 325 of the data has feedback resources 340 configured. In other cases, the transmitting UE may determine that feedback resources 340 are excluded if at least one of the slots having resources reserved by the transmitting UE for the data has feedback resources 340 configured. In further cases, it may be up to the transmitting UE implementation whether it wants to exclude feedback resources 340 or not for TBS determination, and thus set the SCI indication parameter. In other cases, a base station scheduling the sidelink transmission may provide the transmitter UE the information whether feedback resources are excluded for TBS determination. A receiving UE may then perform TBS size determination based at least on the indication in SCI for decoding of the sidelink data transmission.

In cases where the SCI provides an implicit indication of whether feedback resources 340 are to be included or excluded in TBS determination, one or more SCI parameters may be used to provide such an indication. In some cases, an indicated MCS for the sidelink data transmission may provide the indication. For example, feedback resources 340 may be excluded in TBS determination if a coding rate in the MCS is larger than a coding rate threshold (e.g., a pre-defined/(pre)configured coding rate threshold). In some cases, feedback resources 340 may be excluded if the MCS index is larger than an MCS index threshold (e.g., a pre-defined/(pre)configured MCS index threshold from one or more MCS tables that may be used for sidelink communications). In some cases, feedback resources 340 may be excluded if a modulation order is higher than a modulation order index (e.g., for MCS with 64QAM or higher modulation order, feedback resources 340 is excluded). In further cases, a pre-defined or (pre)configured set of MCS indices may be used to indicate whether feedback resources 340 are excluded in TBS determination (e.g., if the MCS used for the sidelink transmission is in the set of MCSs, feedback resources is excluded in TBS determination). In some cases, the values of one or more thresholds or selection of MCS indices may be selected to exclude feedback resources 340 for TBS determination if the coding rate would be relatively large, such that a larger actual coding rate can be avoided.

Additionally or alternatively, the SCI may provide implicit indications through one or more other parameters, such as a priority of the data transmission or transmission mode. In some cases, the priority may be indicated in SCI, and feedback resources 340 may be excluded from TBS determination if the data priority is higher than a priority threshold. In some cases, the transmission mode may be unicast, groupcast, or broadcast, and feedback resources 340 may be excluded from TBS determination if the transmission mode is broadcast, or if the transmission mode is broadcast or groupcast. In some cases, the indication of the transmission mode may be implied by a second stage SCI format. That is, unicast, groupcast, and broadcast transmissions mode have different second stage SCI formats, and this format may be used to determine the transmission mode. Thus, whether to include or exclude feedback resources 340 in such cases may be based on the second stage SCI format. In such cases, the exclusion of the feedback resources 340 may help to avoid higher actual coding rates for traffic with higher priority or traffic that is broadcast/groupcast.

In some cases, if it is determined that feedback resources 340 are excluded in TBS determination, the parameter $N_{symb}^{sh}$ (i.e., number of OFDM symbols allocated for PSSCH transmission) may be determined to be Q, otherwise the parameter may be determined to be Q+3. For example, $N_{symb}^{sh}=9$ if the feedback resources 340 are excluded in TBS determination, (i.e., Q=9) for a normal cyclic prefix (CP) slot (likewise, $n_{symb}^{sh}=7$ for extended CP), and if the feedback resources 340 are not excluded in TBS determination, $N_{symb}^{sh}=12$, for a normal CP slot (or 10 for extended CP slot).

Figure 4:
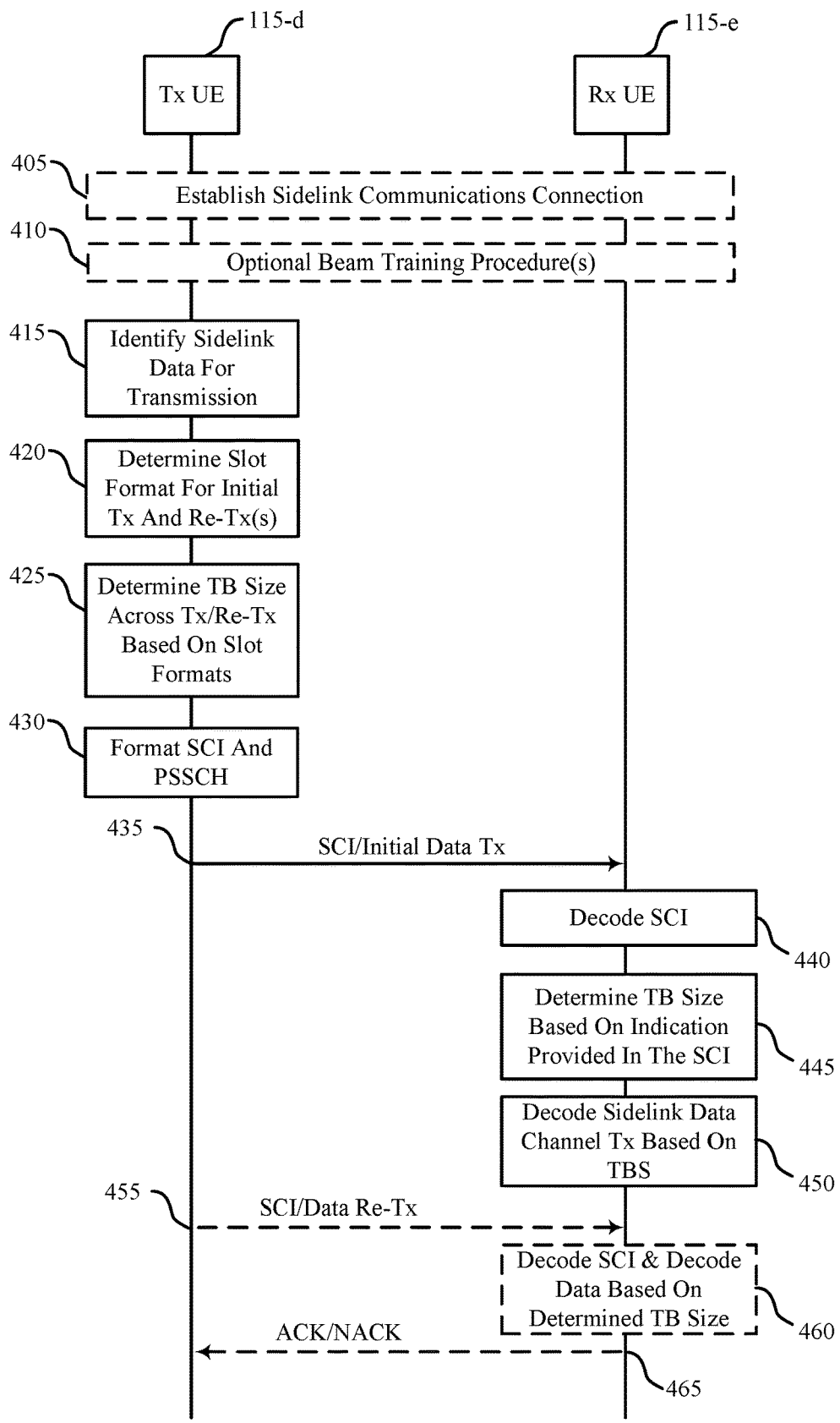
FIG. 4 illustrates an example of a process flow that supports transport block size determination for sidelink communications in accordance with aspects of the present disclosure.

FIG. 4 illustrates an example of a process flow 400 that supports TBS determination for sidelink communications in accordance with aspects of the present disclosure. In some examples, process flow 400 may implement aspects of wireless communications system 100 or 200. Process flow 400 may be implemented by a transmitting UE 115-d, and a receiving UE 115-e, which may be examples of UEs 115 as described herein. Alternative examples of the following may be implemented, where some steps are performed in a different order than described or are not performed at all. In some cases, steps may include additional features not mentioned below, or further steps may be added.

Optionally, at 405, the transmitting UE 115-d, which may be an example of a first UE or a first sidelink communications device as discussed herein, may establish a sidelink communications connection with a receiving UE 115-e, which may be an example of a second UE or a second sidelink communications device as discussed herein. In some cases, sidelink communications may be unicast communications. In other cases, the sidelink communications may be broadcast or groupcast communications to multiple UEs 115. For example, the transmitting UE 115-d may be a group leader for sidelink groupcast communications, and may identify a number of other receiving UEs 115-e as group members for groupcast communications. In cases where the sidelink communications are broadcast communications, the sidelink communications connection with the receiving UE 115-e may not be established. In some cases, the transmitting UE 115-d may reserve sidelink resources for one or more transmissions, which in some cases, may include one or more blind repetitions of an initial transmission to help enhance reliability. Optionally, at 410, one or more beam training procedures may be performed in cases where communications may use beamformed communications.

At 415, the transmitting UE 115-d may identify sidelink data for transmission to the receiving UE 115-e or multiple receiving UEs 115. In some cases, the sidelink data may be high priority data, or high reliability data, and the transmitting UE 115-d may determine that one or more repetitions of the data are to be transmitted.

At 420, the transmitting UE 115-d may determine a slot format for an initial transmission of the data, and for one or more retransmissions of the data. In some cases, the slot format for the initial transmission and one or more of the retransmissions may be different based on one of the slots including PSFCH resources. At 425, the transmitting UE 115-d may determine a TBS for the data transmissions, which may be a same TBS across multiple slots. In some cases, the TBS may be determined based on one or more rules for exclusion or inclusion of PSFCH resources when determining TBS, such as discussed herein.

At 430, the transmitting UE 115-d may format SCI and PSSCH data for transmission according the determined TBS. In some cases, the transmitting UE 115-d may set an explicit indication in the SCI that indicates how the receiving UE 115-e is to determine TBS. In other cases, the TBS may be determined based on one or more implicit indications in the SCI. When formatting the PSSCH, the transmitting UE 115-d may encode sidelink data according to the determined TBS. At 435, the transmitting UE 115-d may transmit the SCI and initial data transmission to the receiving UE 115-e.

At 440, the receiving UE 115-e may decode the SCI received from the transmitting UE 115-d. In some cases, the receiving UE 115-e may buffer the sidelink communications and decode the SCI from configured SCI resources within the sidelink resources that include the sidelink communications. The receiving UE 115-e may identify an indication from the SCI that indicates how TBS is to be determined, such as an explicit indication or implicit indication, as discussed herein. At 445, the receiving UE 115-e may determine the TBS of the sidelink data transmission based on the indication provided in the SCI. At 450, the receiving UE 115-e may decode the sidelink data transmission based on the determined TBS.

Optionally, at 455, the transmitting UE 115-e may transmit one or more retransmissions of the sidelink data along with associated SCI. At 460, the receiving UE 115-e may optionally decode the SCI and sidelink data based on a TBS that is determined from an indication in the SCI. Optionally, at 465, the receiving UE 115-e may transmit acknowledgment/negative-acknowledgment (ACK/NACK) feedback (e.g., HARQ feedback) to the transmitting UE 115-e, in accordance with feedback techniques for acknowledging receipt of communications.

Figure 5:
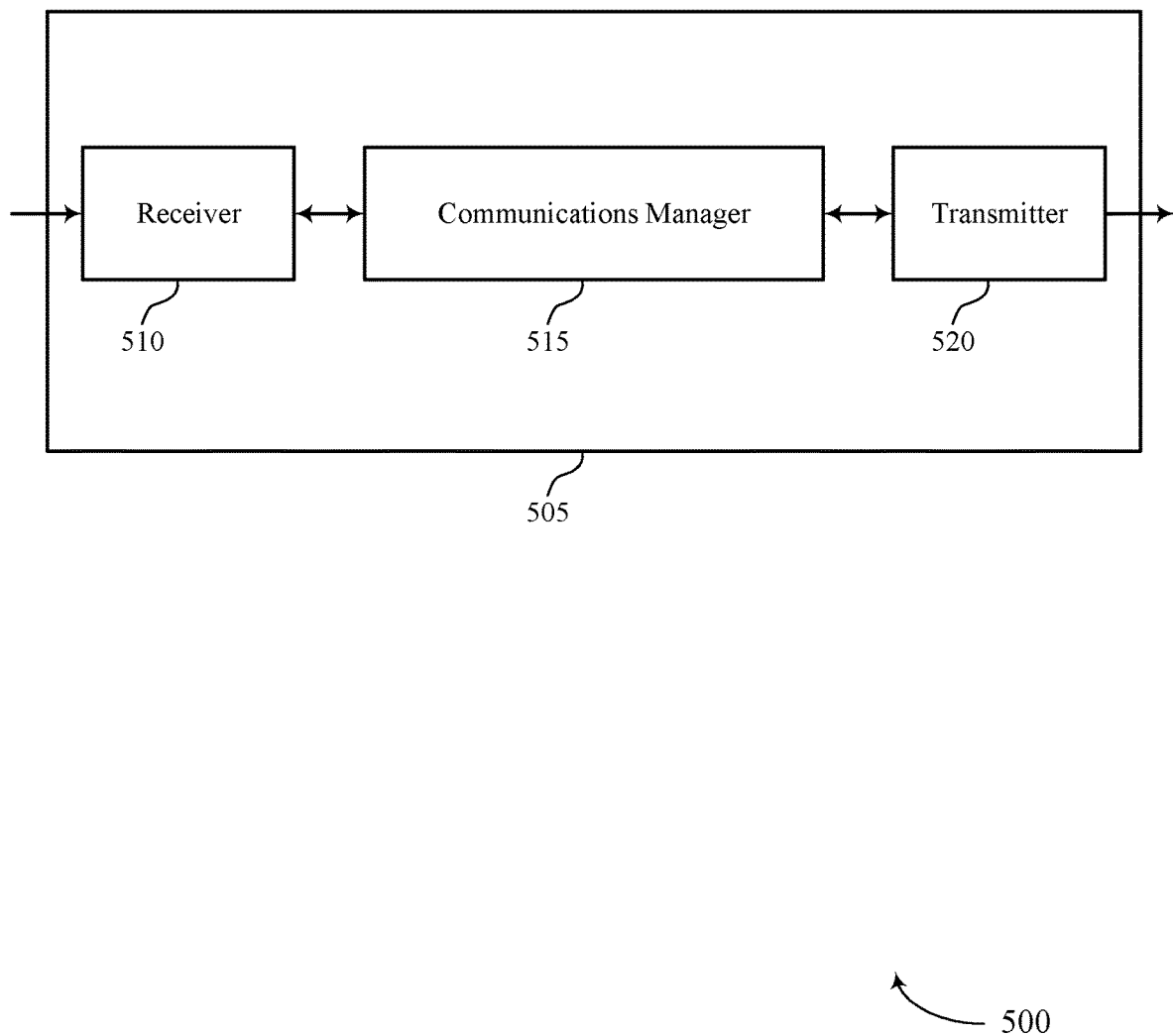
FIGS. 5 and 6 show block diagrams of devices that support transport block size determination for sidelink communications in accordance with aspects of the present disclosure.

FIG. 5 shows a block diagram 500 of a device 505 that supports TBS determination for sidelink communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to TBS determination for sidelink communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515, in cases where the device 505 is a first sidelink communications device that receives sidelink communications, may receive, from a second sidelink communications device, SCI for a sidelink data channel transmission from the second sidelink communications device, and decode the sidelink data channel transmission based on a TBS of the sidelink data channel transmission, where the TBS is determined based on an indication in the SCI. The communications manager 515 may be an example of aspects of the communications manager 810 described herein.

The communications manager 515 in cases where the device 505 is a second sidelink communications device that transmits sidelink communications, may identify sidelink data that is to be transmitted to at least a first sidelink communications device in a sidelink data channel transmission from the second sidelink communications device, determine a TBS for the sidelink data channel transmission based on a slot format of one or more slots reserved for transmission of the sidelink data channel transmission, transmit the sidelink data channel transmission to the first sidelink communications device, where the sidelink data is encoded in the sidelink data channel transmission according to the determined TBS, and transmit SCI that indicates the slot format for TBS determination for the sidelink data channel transmission. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
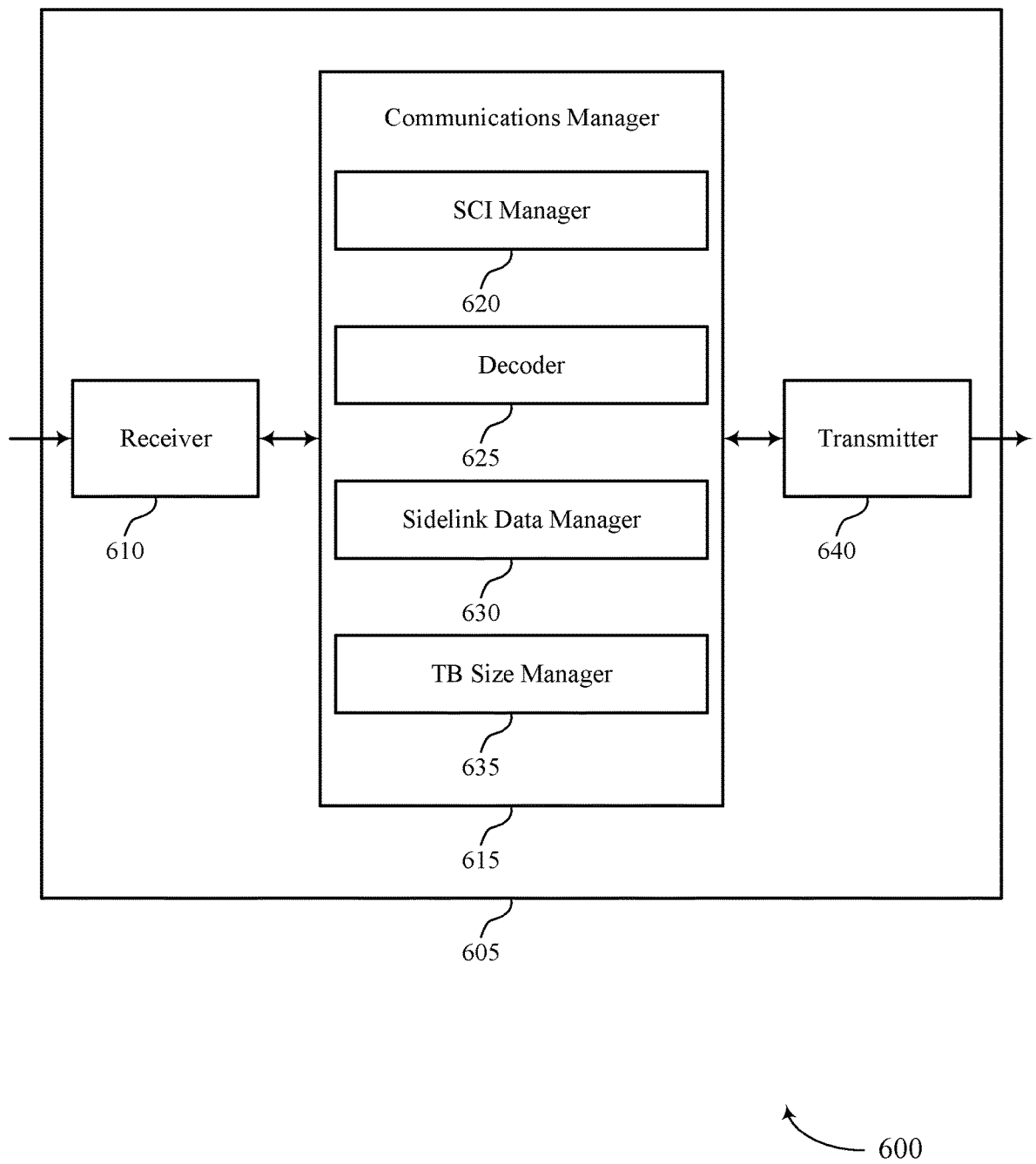

FIG. 6 shows a block diagram 600 of a device 605 that supports TBS determination for sidelink communications in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to TBS determination for sidelink communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a SCI manager 620, a decoder 625, a sidelink data manager 630, and a TB size manager 635. The communications manager 615 may be an example of aspects of the communications manager 810 described herein.

In cases where the device 605 is a first sidelink communications device that received sidelink communications, the SCI manager 620 may receive, from a second sidelink communications device, SCI for a sidelink data channel transmission from the second sidelink communications device. The decoder 625 may decode the sidelink data channel transmission based on a TBS of the sidelink data channel transmission, where the TBS is determined based on an indication in the SCI.

In cases where the device 605 is a second sidelink communications device that transmits sidelink communications, the sidelink data manager 630 may identify sidelink data that is to be transmitted to at least a first sidelink communications device in a sidelink data channel transmission from the second sidelink communications device and transmit the sidelink data channel transmission to the first sidelink communications device, where the sidelink data is encoded in the sidelink data channel transmission according to a determined TBS. The TB size manager 635 may determine the TBS for the sidelink data channel transmission based on a slot format of one or more slots reserved for transmission of the sidelink data channel transmission. The SCI manager 620 may transmit, to the first sidelink communications device, SCI that indicates the slot format for TBS determination for the sidelink data channel transmission.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
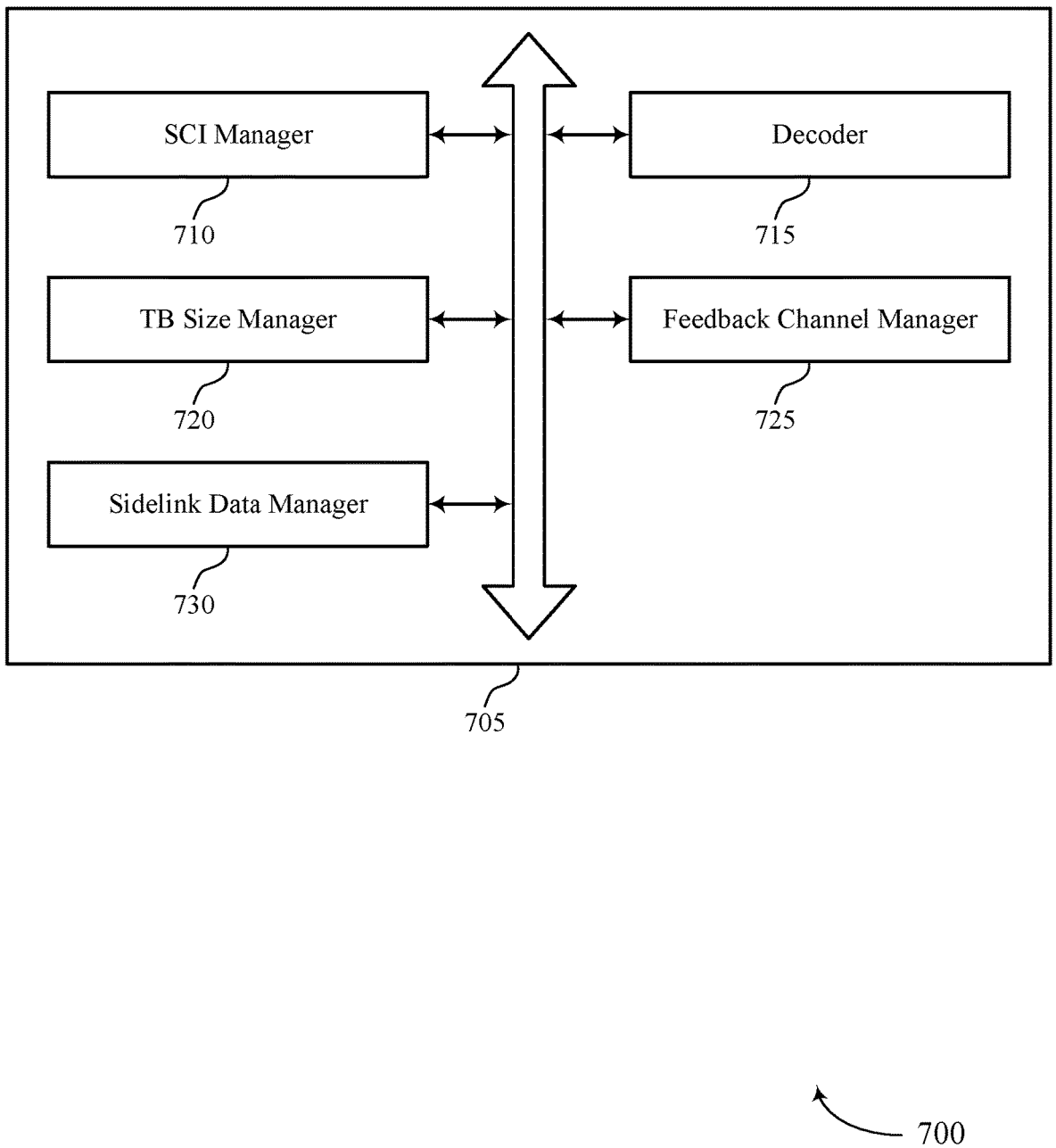
FIG. 7 shows a block diagram of a communications manager that supports transport block size determination for sidelink communications in accordance with aspects of the present disclosure.

FIG. 7 shows a block diagram 700 of a communications manager 705 that supports TBS determination for sidelink communications in accordance with aspects of the present disclosure. The communications manager 705 may be an example of aspects of a communications manager 515, a communications manager 615, or a communications manager 810 described herein. The communications manager 705 may include a SCI manager 710, a decoder 715, a TB size manager 720, a feedback channel manager 725, and a sidelink data manager 730. Each of these modules may communicate, directly or indirectly, with one another (e.g., via one or more buses).

The SCI manager 710 may receive, from a second sidelink communications device, SCI for a sidelink data channel transmission from the second sidelink communications device.

In some examples, the SCI manager 710 may transmit, to the first sidelink communications device, SCI that indicates the slot format for TBS determination for the sidelink data channel transmission.

In some cases, the indication in the SCI is an explicit indication of whether feedback channel resources within a transmission slot are to be used in determination of the TBS. In some cases, the explicit indication includes one or more bits in the SCI that indicate whether the feedback channel resources are to be included or excluded in determination of the TBS. In some cases, the explicit indication is provided in first stage SCI that is received in a sidelink control channel communication, in second stage SCI that is multiplexed with sidelink data in a sidelink shared channel communication, or combinations thereof.

In some cases, the indication in the SCI is an implicit indication of whether feedback channel resources within a transmission slot are to be used in determination of the TBS. In some cases, the implicit indication is based on a modulation and coding scheme (MCS) used for the sidelink data transmission. In some cases, the implicit indication is based on one or more values of one or more parameters of a sidelink grant for the sidelink data channel transmission that is provided by the SCI. In some cases, the one or more parameters include a data priority of the sidelink data channel transmission, and where the feedback channel resources are excluded in determination of the TBS when the data priority exceeds a data priority threshold value. In some cases, the one or more parameters indicate that the sidelink data channel transmission is a unicast transmission, a groupcast transmission, or a broadcast transmission, and where the feedback channel resources are excluded in determination of the TBS when the sidelink data channel transmission is a groupcast transmission or a broadcast transmission.

The decoder 715 may decode the sidelink data channel transmission based on a TBS of the sidelink data channel transmission, where the TBS is determined based on an indication in the SCI.

The TB size manager 720 may determine a TBS for the sidelink data channel transmission based on a slot format of one or more slots reserved for transmission of the sidelink data channel transmission. In some examples, the TB size manager 720 may determine the TBS based on a number of orthogonal frequency division multiplexing (OFDM) symbols within a slot that are associated with the sidelink data channel transmission, and where the number of OFDM symbols is determined based on the indication in the SCI. In some examples, the TB size manager 720 may determine a number of orthogonal frequency division multiplexing (OFDM) symbols within the one or more slots reserved for transmission of the sidelink data channel transmission based on the slot format.

In some cases, the indication in the SCI indicates at least whether a first slot format or a second slot format is used for determination of the TBS. In some cases, the first slot format includes a first number of orthogonal frequency division multiplexing (OFDM) symbols available for shared channel transmissions and the second slot format includes a second number of OFDM symbols available for shared channel transmissions that is less than the first number of OFDM symbols. In some cases, a first value or a second value of the number of OFDM symbols is used for determining the TBS based on the indication identifying whether one or more OFDM symbols configured to provide feedback transmissions in one or more slots are to be included or excluded when determining the TBS.

The sidelink data manager 730 may identify sidelink data that is to be transmitted to at least a first sidelink communications device in a sidelink data channel transmission from the second sidelink communications device. In some examples, the sidelink data manager 730 may transmit the sidelink data channel transmission to the first sidelink communications device, where the sidelink data is encoded in the sidelink data channel transmission according to the determined TBS.

The feedback channel manager 725 may identify sidelink feedback channel resources. In some cases, the feedback channel resources are excluded in determination of the TBS when a coding rate of the MCS exceeds a coding rate threshold value, and the feedback channel resources are included in determination of the TBS when the coding rate is at or below the coding rate threshold value. In some cases, the feedback channel resources are excluded in determination of the TBS when a MCS index provided in the SCI exceeds a MCS index threshold value, and the feedback channel resources are included in determination of the TBS when the MCS index is at or below the MCS index threshold value. In some cases, the feedback channel resources are excluded in determination of the TBS when a modulation order of the MCS exceeds a modulation order threshold value, and the feedback channel resources are included in determination of the TBS when the modulation order is at or below the modulation order threshold value. In some cases, the feedback channel resources are excluded in determination of the TBS when a MCS index provided in the SCI is in a predetermined set of MCS index values, and the feedback channel resources are included in determination of the TBS when the MCS index is outside of the predetermined set of MCS index values.

In some cases, the feedback channel resources are excluded in determination of the TBS when a slot for an initial sidelink data channel transmission includes feedback channel resources, and the feedback channel resources are included in determination of the TBS when the slot for the initial sidelink data channel transmissions does not include feedback channel resources. In some cases, the feedback channel resources are excluded in determination of the TBS when at least one slot that has resources reserved for sidelink data channel transmissions includes feedback channel resources, and the feedback channel resources are included in determination of the TBS when all slots that have resources reserved for the sidelink data channel transmissions do not include feedback channel resources.

Figure 8:
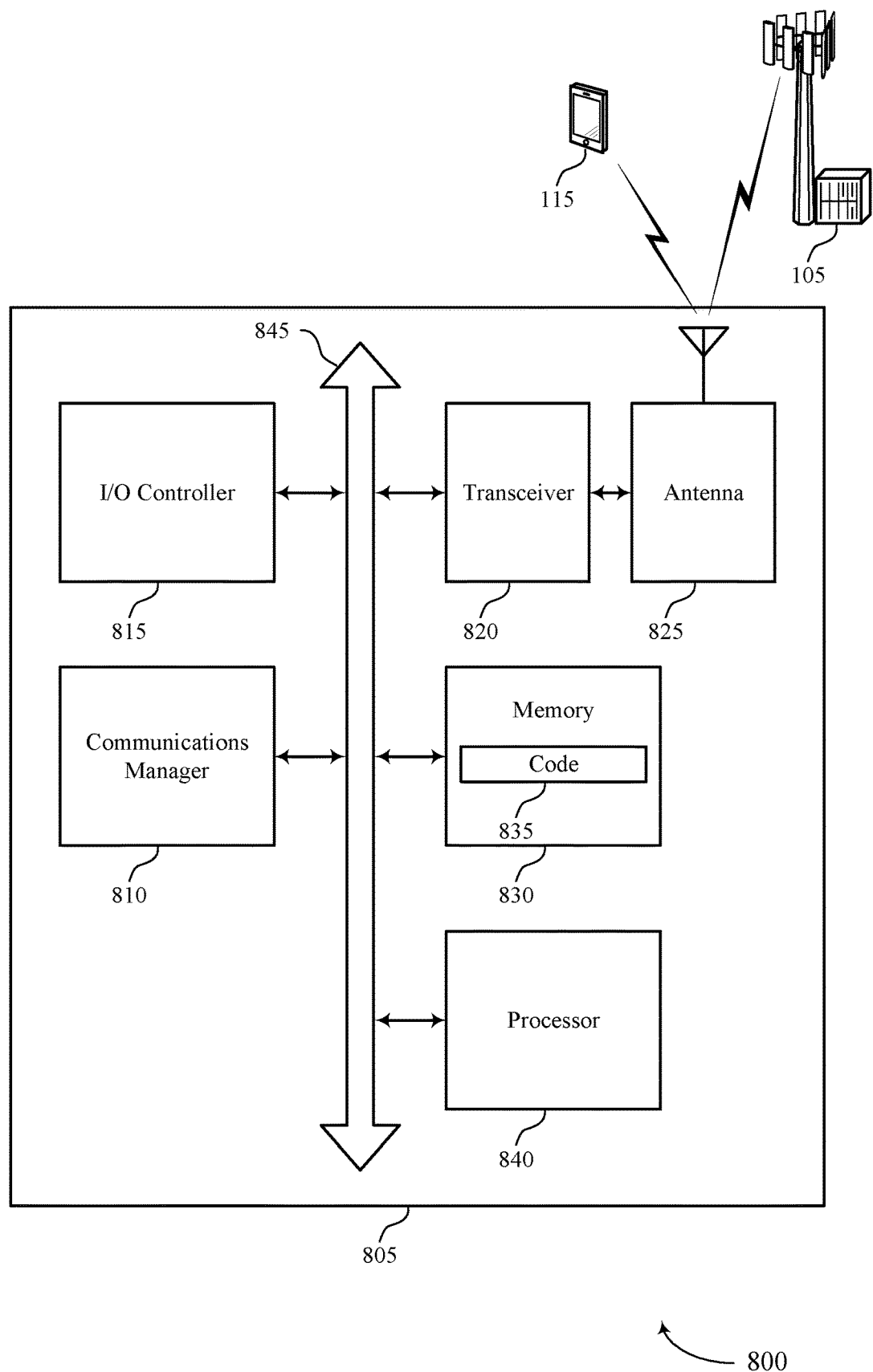
FIG. 8 shows a diagram of a system including a device that supports transport block size determination for sidelink communications in accordance with aspects of the present disclosure.

FIG. 8 shows a diagram of a system 800 including a device 805 that supports TBS determination for sidelink communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

In some cases, the communications manager 810 may receive, from a second sidelink communications device, SCI for a sidelink data channel transmission from the second sidelink communications device and decode the sidelink data channel transmission based on a TBS of the sidelink data channel transmission, where the TBS is determined based on an indication in the SCI.

In some cases, the communications manager 810 may identify sidelink data that is to be transmitted to at least a first sidelink communications device in a sidelink data channel transmission from the second sidelink communications device, transmit the sidelink data channel transmission to the first sidelink communications device, where the sidelink data is encoded in the sidelink data channel transmission according to the determined TBS, determine a TBS for the sidelink data channel transmission based on a slot format of one or more slots reserved for transmission of the sidelink data channel transmission, and transmit, to the first sidelink communications device, SCI that indicates the slot format for TBS determination for the sidelink data channel transmission.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting TBS determination for sidelink communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
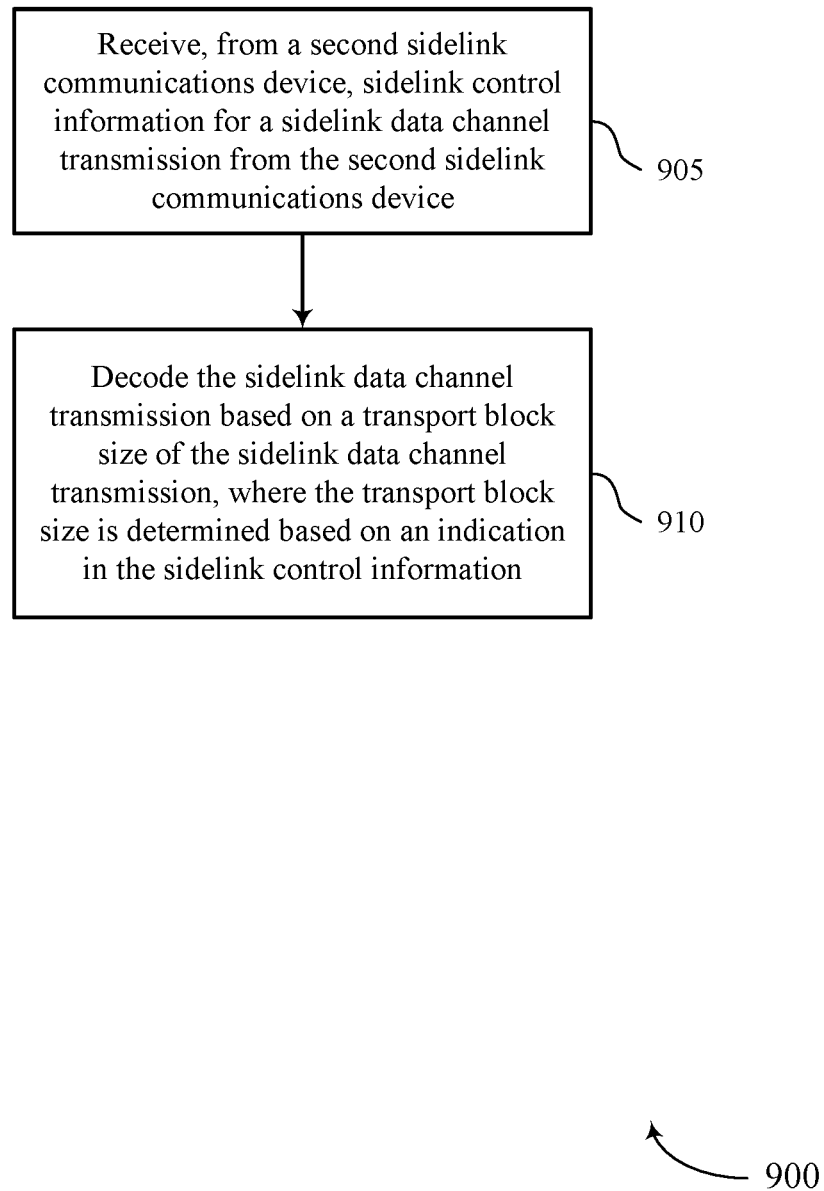
FIGS. 9 through 12 show flowcharts illustrating methods that support transport block size determination for sidelink communications in accordance with aspects of the present disclosure.

FIG. 9 shows a flowchart illustrating a method 900 that supports TBS determination for sidelink communications in accordance with aspects of the present disclosure. The operations of method 900 may be implemented by a UE 115 or its components as described herein, which may be a first sidelink communications device. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the first sidelink communications device may receive, from a second sidelink communications device, SCI for a sidelink data channel transmission from the second sidelink communications device. The operations of 905 may be performed according to the methods described herein. In some examples, aspects of the operations of 905 may be performed by a SCI manager as described with reference to FIGS. 5 through 8.

At 910, the first sidelink communications device may decode the sidelink data channel transmission based on a TBS of the sidelink data channel transmission, where the TBS is determined based on an indication in the SCI. The operations of 910 may be performed according to the methods described herein. In some examples, aspects of the operations of 910 may be performed by a decoder as described with reference to FIGS. 5 through 8.

Figure 10:
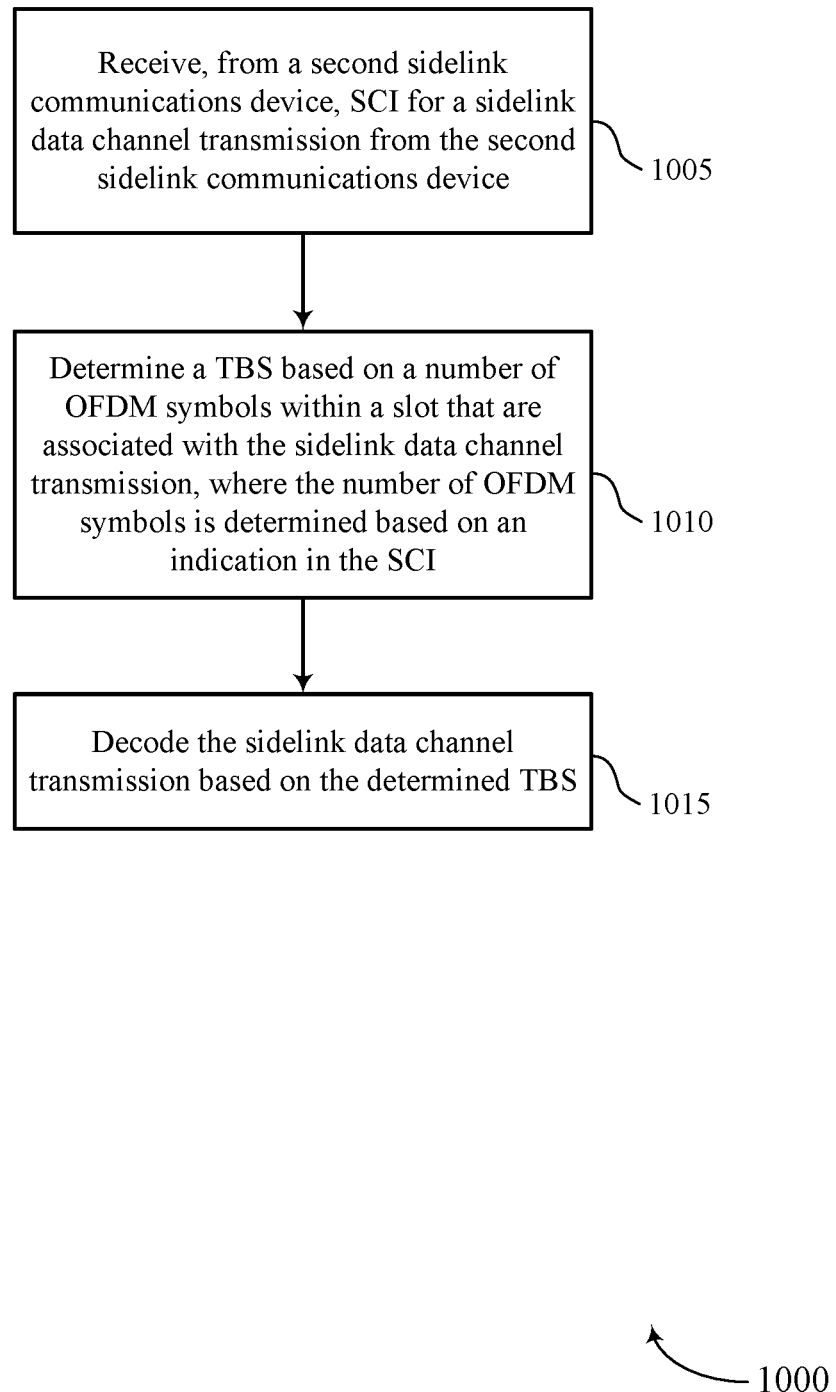

FIG. 10 shows a flowchart illustrating a method 1000 that supports TBS determination for sidelink communications in accordance with aspects of the present disclosure. The operations of method 1000 may be implemented by a UE 115 or its components as described herein, which may be a first sidelink communications device. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the first sidelink communications device may receive, from a second sidelink communications device, SCI for a sidelink data channel transmission from the second sidelink communications device. The operations of 1005 may be performed according to the methods described herein. In some examples, aspects of the operations of 1005 may be performed by a SCI manager as described with reference to FIGS. 5 through 8.

At 1010, the first sidelink communications device may determine a TBS based on a number of OFDM symbols within a slot that are associated with the sidelink data channel transmission, where the number of OFDM symbols is determined based on an indication in the SCI. The operations of 1010 may be performed according to the methods described herein. In some examples, aspects of the operations of 1010 may be performed by a TB size manager as described with reference to FIGS. 5 through 8.

At 1015, the first sidelink communications device may decode the sidelink data channel transmission based on the determined TBS. The operations of 1015 may be performed according to the methods described herein. In some examples, aspects of the operations of 1015 may be performed by a TB size manager as described with reference to FIGS. 5 through 8.

Figure 11:
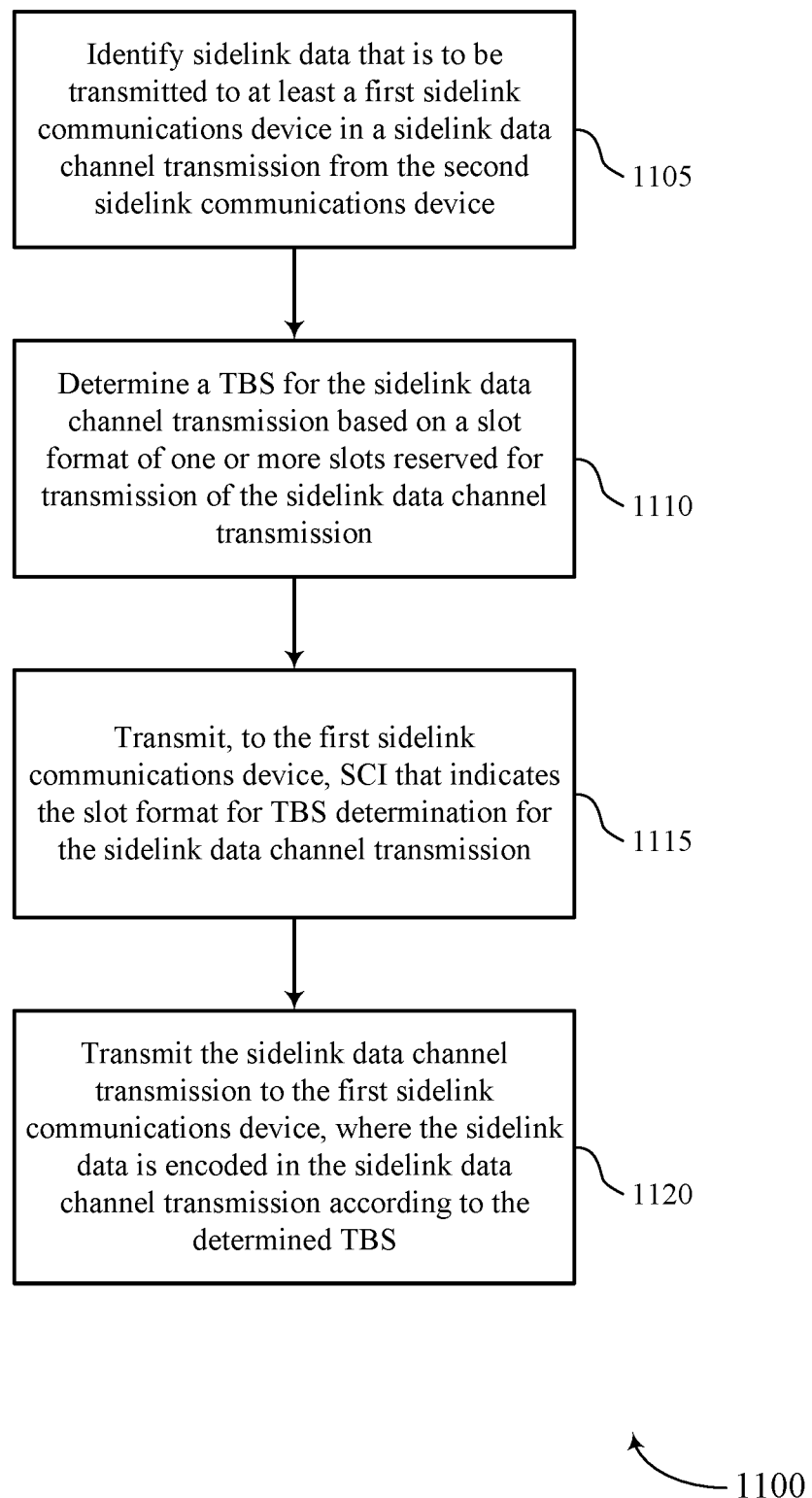

FIG. 11 shows a flowchart illustrating a method 1100 that supports TBS determination for sidelink communications in accordance with aspects of the present disclosure. The operations of method 1100 may be implemented by a UE 115 or its components, which may be an example of a second sidelink communications device as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the second sidelink communications device may identify sidelink data that is to be transmitted to at least a first sidelink communications device in a sidelink data channel transmission from the second sidelink communications device. The operations of 1105 may be performed according to the methods described herein. In some examples, aspects of the operations of 1105 may be performed by a sidelink data manager as described with reference to FIGS. 5 through 8.

At 1110, the second sidelink communications device may determine a TBS for the sidelink data channel transmission based on a slot format of one or more slots reserved for transmission of the sidelink data channel transmission. The operations of 1110 may be performed according to the methods described herein. In some examples, aspects of the operations of 1110 may be performed by a TB size manager as described with reference to FIGS. 5 through 8.

At 1115, the second sidelink communications device may transmit, to the first sidelink communications device, SCI that indicates the slot format for TBS determination for the sidelink data channel transmission. The operations of 1115 may be performed according to the methods described herein. In some examples, aspects of the operations of 1115 may be performed by a SCI manager as described with reference to FIGS. 5 through 8.

At 1120, the second sidelink communications device may transmit the sidelink data channel transmission to the first sidelink communications device, where the sidelink data is encoded in the sidelink data channel transmission according to the determined TBS. The operations of 1120 may be performed according to the methods described herein. In some examples, aspects of the operations of 1120 may be performed by a sidelink data manager as described with reference to FIGS. 5 through 8.

Figure 12:
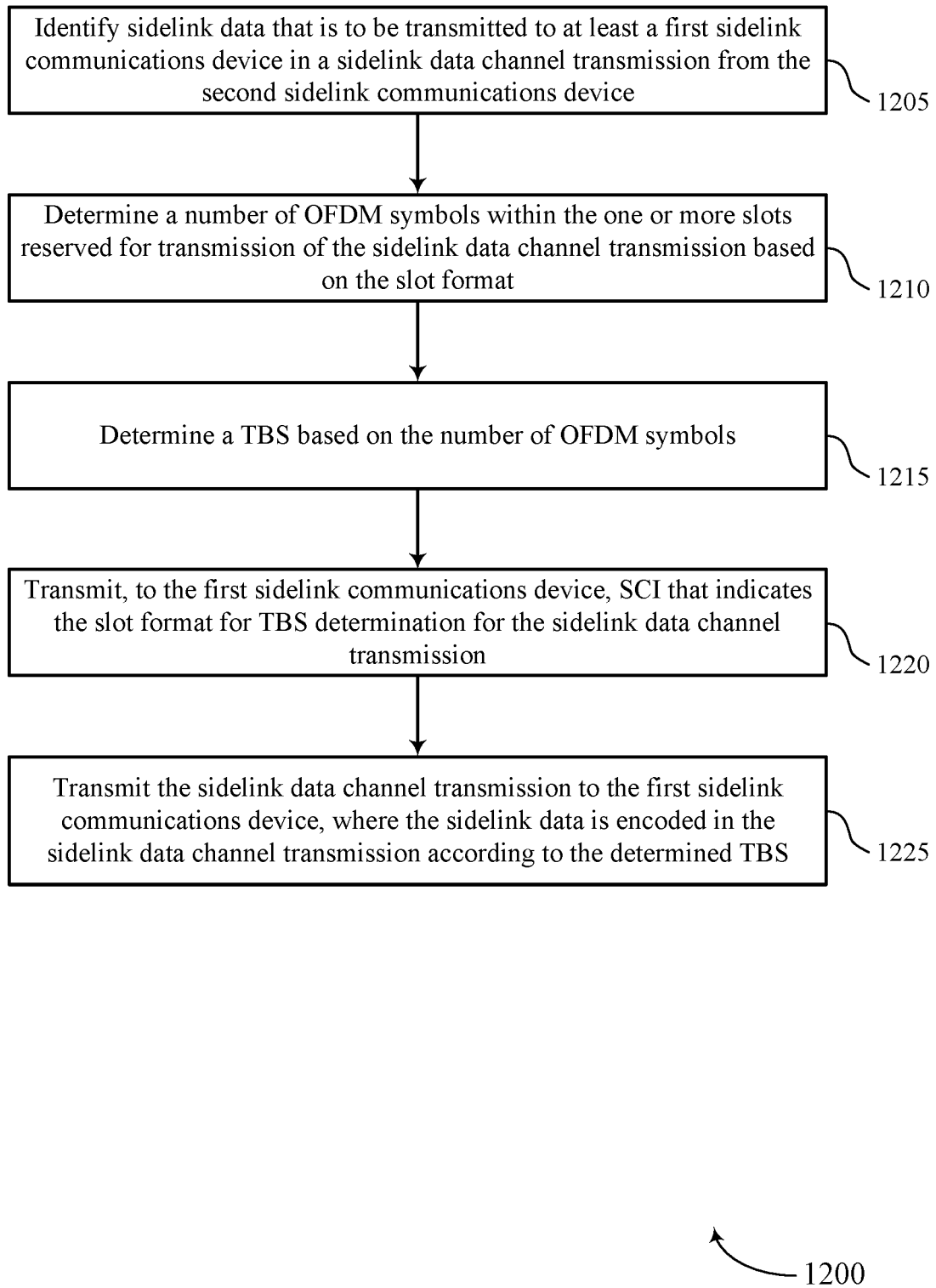

FIG. 12 shows a flowchart illustrating a method 1200 that supports TBS determination for sidelink communications in accordance with aspects of the present disclosure. The operations of method 1200 may be implemented by a UE 115 or its components, which may be an example of a second sidelink communications device as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the second sidelink communications device may identify sidelink data that is to be transmitted to at least a first sidelink communications device in a sidelink data channel transmission from the second sidelink communications device. The operations of 1205 may be performed according to the methods described herein. In some examples, aspects of the operations of 1205 may be performed by a sidelink data manager as described with reference to FIGS. 5 through 8.

At 1210, the second sidelink communications device may determine a number of OFDM symbols within the one or more slots reserved for transmission of the sidelink data channel transmission based on the slot format. The operations of 1210 may be performed according to the methods described herein. In some examples, aspects of the operations of 1210 may be performed by a TB size manager as described with reference to FIGS. 5 through 8.

At 1215, the second sidelink communications device may determine a TBS based on the number of OFDM symbols. The operations of 1215 may be performed according to the methods described herein. In some examples, aspects of the operations of 1215 may be performed by a TB size manager as described with reference to FIGS. 5 through 8.

At 1220, the second sidelink communications device may transmit, to the first sidelink communications device, SCI that indicates the slot format for TBS determination for the sidelink data channel transmission. The operations of 1220 may be performed according to the methods described herein. In some examples, aspects of the operations of 1220 may be performed by a SCI manager as described with reference to FIGS. 5 through 8.

At 1225, the second sidelink communications device may transmit the sidelink data channel transmission to the first sidelink communications device, where the sidelink data is encoded in the sidelink data channel transmission according to the determined TBS. The operations of 1225 may be performed according to the methods described herein. In some examples, aspects of the operations of 1225 may be performed by a sidelink data manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous embodiments or aspects described herein.

Example 1 is a method for wireless communication at a first sidelink communications device that includes receiving, from a second sidelink communications device, sidelink control information for a sidelink data channel transmission from the second sidelink communications device, and decoding the sidelink data channel transmission based at least in part on a transport block size of the sidelink data channel transmission, where the transport block size is determined based at least in part on an indication in the sidelink control information.

In example 2 the method of example 1 may include where the indication in the sidelink control information indicates at least whether a first slot format or a second slot format is used for determination of the transport block size.

In example 3 the method of examples 1-2 may include where the first slot format includes a first number of OFDM symbols available for shared channel transmissions and the second slot format includes a second number of OFDM symbols available for shared channel transmissions that is less than the first number of OFDM symbols.

In example 4 the method of examples 1-3 may include where the indication in the sidelink control information is an explicit indication of whether feedback channel resources within a transmission slot are to be used in determination of the transport block size.

In example 5 the method of example 4 may include where the explicit indication comprises one or more bits in the sidelink control information that indicate whether the feedback channel resources are to be included or excluded in determination of the transport block size.

In example 6 the method of examples 4-5 may include where the explicit indication is provided in first stage sidelink control information that is received in a sidelink control channel communication, in second stage sidelink control information that is multiplexed with sidelink data in a sidelink shared channel communication, or combinations thereof.

In example 7 the method of examples 1-6 may include where the indication in the sidelink control information is an implicit indication of whether feedback channel resources within a transmission slot are to be used in determination of the transport block size.

In example 8 the method of example 7 may include where the implicit indication is based on a MCS used for the sidelink data transmission.

In example 9 the method of example 8 may include where the feedback channel resources are excluded in determination of the transport block size when a coding rate of the MCS exceeds a coding rate threshold value, and the feedback channel resources are included in determination of the transport block size when the coding rate is at or below the coding rate threshold value.

In example 10 the method of examples 8-9 may include where the feedback channel resources are excluded in determination of the transport block size when a MCS index provided in the sidelink control information exceeds a MCS index threshold value, and the feedback channel resources are included in determination of the transport block size when the MCS index is at or below the MCS index threshold value.

In example 11 the method of examples 8-10 may include where the feedback channel resources are excluded in determination of the transport block size when a modulation order of the MCS exceeds a modulation order threshold value, and the feedback channel resources are included in determination of the transport block size when the modulation order is at or below the modulation order threshold value.

In example 12 the method of examples 8-10 may include where the feedback channel resources are excluded in determination of the transport block size when a MCS index provided in the sidelink control information is in a predetermined set of MCS index values, and the feedback channel resources are included in determination of the transport block size when the MCS index is outside of the predetermined set of MCS index values.

In example 13 the method of examples 7-12 may include where the implicit indication is based on one or more values of one or more parameters of a sidelink grant for the sidelink data channel transmission that is provided by the sidelink control information.

In example 14 the method of example 13 may include where the one or more parameters include a data priority of the sidelink data channel transmission, and where the feedback channel resources are excluded in determination of the transport block size when the data priority exceeds a data priority threshold value.

In example 15 the method of examples 13-14 may include where the one or more parameters indicate that the sidelink data channel transmission is a unicast transmission, a groupcast transmission, or a broadcast transmission, and where the feedback channel resources are excluded in determination of the transport block size when the sidelink data channel transmission is a groupcast transmission or a broadcast transmission.

In example 16 the method of examples 1-15 may further include determining the transport block size based at least in part on a number of orthogonal frequency division multiplexing (OFDM) symbols within a slot that are associated with the sidelink data channel transmission, and where the number of OFDM symbols is determined based on the indication in the sidelink control information.

In example 17 the method of example 16 may include where a first value or a second value of the number of OFDM symbols is used for determining the transport block size based at least in part on the indication identifying whether one or more OFDM symbols configured to provide feedback transmissions in one or more slots are to be included or excluded when determining the transport block size.

Example 18 is a system including one or more processors and memory in electronic communication with the one or more processors storing instructions executable by the one or more processors to cause the system or apparatus to implement a method as in any of examples 1-17.

Example 19 is an apparatus including means for implementing a method or realizing an apparatus as in any of examples 1-17.

Example 20 is a non-transitory computer-readable medium storing instructions executable by one or more processors to cause the one or more processors to implement a method as in any of examples 1-17.

Example 21 is a method for wireless communication at a second sidelink communications device that includes identifying sidelink data that is to be transmitted to at least a first sidelink communications device in a sidelink data channel transmission from the second sidelink communications device, determining a transport block size for the sidelink data channel transmission based at least in part on a slot format of one or more slots reserved for transmission of the sidelink data channel transmission, transmitting, to the first sidelink communications device, sidelink control information that indicates the slot format for transport block size determination for the sidelink data channel transmission, and transmitting the sidelink data channel transmission to the first sidelink communications device, where the sidelink data is encoded in the sidelink data channel transmission according to the determined transport block size.

In example 22 the method of example 21 may include where the indication in the sidelink control information indicates at least whether a first slot format or a second slot format is used for determination of the transport block size.

In example 23 the method of examples 21-22 may include where the first slot format includes a first number of orthogonal frequency division multiplexing (OFDM) symbols available for shared channel transmissions and the second slot format includes a second number of OFDM symbols available for shared channel transmissions that is less than the first number of OFDM symbols.

In example 24 the method of examples 21-23 may include where the indication in the sidelink control information is an explicit indication of whether feedback channel resources within a transmission slot are to be used at the first sidelink communications device to determination of the transport block size.

In example 25 the method of example 24 may include where the explicit indication comprises one or more bits in the sidelink control information that indicate whether the feedback channel resources are to be included or excluded in determination of the transport block size.

In example 26 the method of examples 24-25 may include where the explicit indication is provided in first stage sidelink control information that is transmitted in a sidelink control channel communication, in second stage sidelink control information that is multiplexed with sidelink data in a sidelink shared channel communication, or combinations thereof.

In example 27 the method of examples 24-26 may include where the feedback channel resources are excluded in determination of the transport block size when a slot for an initial sidelink data channel transmission includes feedback channel resources, and the feedback channel resources are included in determination of the transport block size when the slot for the initial sidelink data channel transmissions does not include feedback channel resources.

In example 28 the method of examples 24-27 may include where the feedback channel resources are excluded in determination of the transport block size when at least one slot that has resources reserved for sidelink data channel transmissions includes feedback channel resources, and the feedback channel resources are included in determination of the transport block size when all slots that have resources reserved for the sidelink data channel transmissions do not include feedback channel resources.

In example 29 the method of examples 21-23 may include where the indication in the sidelink control information is an implicit indication of whether feedback channel resources within a transmission slot are to be used in determination of the transport block size.

In example 30 the method of example 29 may include where the implicit indication is based on a MCS used for the sidelink data transmission.

In example 31 the method of example 30 may include where the feedback channel resources are excluded in determination of the transport block size when a coding rate of the MCS exceeds a coding rate threshold value, and the feedback channel resources are included in determination of the transport block size when the coding rate is at or below the coding rate threshold value.

In example 32 the method of examples 30-31 may include where the feedback channel resources are excluded in determination of the transport block size when a MCS index provided in the sidelink control information exceeds a MCS index threshold value, and the feedback channel resources are included in determination of the transport block size when the MCS index is at or below the MCS index threshold value.

In example 33 the method of examples 30-32 may include where the feedback channel resources are excluded in determination of the transport block size when a modulation order of the MCS exceeds a modulation order threshold value, and the feedback channel resources are included in determination of the transport block size when the modulation order is at or below the modulation order threshold value.

In example 34 the method of examples 30-33 may include where the feedback channel resources are excluded in determination of the transport block size when a MCS index provided in the sidelink control information is in a predetermined set of MCS index values, and the feedback channel resources are included in determination of the transport block size when the MCS index is outside of the predetermined set of MCS index values.

In example 35, the method of example 29 may include where the implicit indication is based on one or more values of one or more parameters of a sidelink grant for the sidelink data channel transmission that is provided by the sidelink control information.

In example 36 the method of example 35 may include where the one or more parameters include a data priority of the sidelink data channel transmission, and where the feedback channel resources are excluded in determination of the transport block size when the data priority exceeds a data priority threshold value.

In example 37 the method of examples 35-36 may include where the one or more parameters indicate that the sidelink data channel transmission is a unicast transmission, a groupcast transmission, or a broadcast transmission, and where the feedback channel resources are excluded in determination of the transport block size when the sidelink data channel transmission is a groupcast transmission or a broadcast transmission.

In example 38 the method of examples 21-37 may include where the determining the transport block size comprises determining a number of OFDM symbols within the one or more slots reserved for transmission of the sidelink data channel transmission based on the slot format and determining the transport block size based at least in part on the number of OFDM symbols.

In example 39 the method of example 38 may include where a first value or a second value of the number of OFDM symbols is used for determining the transport block size based at least in part on whether one or more OFDM symbols configured to provide feedback transmissions in the one or more slots are included or excluded when determining the transport block size.

Example 40 is a system including one or more processors and memory in electronic communication with the one or more processors storing instructions executable by the one or more processors to cause the system or apparatus to implement a method as in any of examples 21-39.

Example 41 is an apparatus including means for implementing a method or realizing an apparatus as in any of examples 21-39.

Example 42 is a non-transitory computer-readable medium storing instructions executable by one or more processors to cause the one or more processors to implement a method as in any of examples 21-39.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a transmitting sidelink communications device, comprising:
   determining a transport block size for a sidelink data channel transmission to at least a first sidelink communications device, the transport block size based at least in part on a first slot format or a second slot format of one or more slots reserved for the sidelink data channel transmission, wherein the first slot format includes a first number of orthogonal frequency division multiplexing (OFDM) symbols available for sidelink data channel transmissions and the second slot format includes a second number of OFDM symbols available for sidelink data channel transmissions that is less than the first number of OFDM symbols to accommodate physical sidelink feedback channel resources in the second slot format;
   transmitting, to the first sidelink communications device, sidelink control information that provides an indication that the first slot format or the second slot format is to be used for transport block size determination for the sidelink data channel transmission; and
   transmitting the sidelink data channel transmission to the first sidelink communications device, wherein sidelink data is encoded in the sidelink data channel transmission according to the determined transport block size.

2. The method of claim 1, wherein the indication in the sidelink control information is an explicit indication that physical sidelink feedback channel resources within a transmission slot are to be included or excluded at the first sidelink communications device to determine the transport block size.

3. The method of claim 2, wherein the explicit indication comprises one or more bits in the sidelink control information that indicate whether the physical sidelink feedback channel resources are to be included or excluded in determination of the transport block size.

4. The method of claim 2, wherein the explicit indication is provided in first stage sidelink control information that is transmitted in a physical sidelink control channel.

5. The method of claim 2, wherein a difference of three orthogonal frequency division multiplexing (OFDM) symbols within the transmission slot are used in the transport block size determination based on whether the physical sidelink feedback channel resources are included or excluded at the first sidelink communications device to determine the transport block size.

6. The method of claim 2, wherein the physical sidelink feedback channel resources are excluded in determination of the transport block size when a slot for an initial sidelink data channel transmission includes physical sidelink feedback channel resources, and the physical sidelink feedback channel resources are included in determination of the transport block size when the slot for the initial sidelink data channel transmissions does not include physical sidelink feedback channel resources.

7. The method of claim 2, wherein the physical sidelink feedback channel resources are excluded in determination of the transport block size when at least one slot that has resources reserved for sidelink data channel transmissions includes physical sidelink feedback channel resources, and the physical sidelink feedback channel resources are included in determination of the transport block size when all slots that have resources reserved for the sidelink data channel transmissions do not include physical sidelink feedback channel resources.

8. The method of claim 1, wherein the indication in the sidelink control information is an implicit indication of whether physical sidelink feedback channel resources within a transmission slot are to be excluded in determination of the transport block size.

9. The method of claim 8, wherein the implicit indication is based on a modulation and coding scheme (MCS) used for the sidelink data channel transmission.

10. The method of claim 9, wherein the physical sidelink feedback channel resources are excluded in determination of the transport block size when a coding rate of the MCS exceeds a coding rate threshold value, and the physical sidelink feedback channel resources are included in determination of the transport block size when the coding rate is at or below the coding rate threshold value.

11. The method of claim 9, wherein the physical sidelink feedback channel resources are excluded in determination of the transport block size when a MCS index provided in the sidelink control information exceeds a MCS index threshold value, and the physical sidelink feedback channel resources are included in determination of the transport block size when the MCS index is at or below the MCS index threshold value.

12. The method of claim 9, wherein the physical sidelink feedback channel resources are excluded in determination of the transport block size when a modulation order of the MCS exceeds a modulation order threshold value, and the physical sidelink feedback channel resources are included in determination of the transport block size when the modulation order is at or below the modulation order threshold value.

13. The method of claim 9, wherein the physical sidelink feedback channel resources are excluded in determination of the transport block size when a MCS index provided in the sidelink control information is in a predetermined set of MCS index values, and the physical sidelink feedback channel resources are included in determination of the transport block size when the MCS index is outside of the predetermined set of MCS index values.

14. The method of claim 8, wherein the implicit indication is based on one or more values of one or more parameters of a sidelink grant for the sidelink data channel transmission that is provided by the sidelink control information.

15. The method of claim 1, wherein the determining the transport block size comprises:
determining a number of orthogonal frequency division multiplexing (OFDM) symbols within the one or more slots reserved for transmission of the sidelink data channel transmission based on the first slot format or the second slot format; and
determining the transport block size based at least in part on the number of OFDM symbols.

16. The method of claim 15, wherein a first value or a second value of the number of OFDM symbols is used for determining the transport block size based at least in part on whether one or more OFDM symbols configured to provide feedback transmissions in the one or more slots are included or excluded when determining the transport block size.

17. A method for wireless communication at a first sidelink communications device, comprising:
receiving, from a second sidelink communications device, sidelink control information for a sidelink data channel transmission from the second sidelink communications device, the sidelink control information including an indication of a first slot format or a second slot format for determination of a transport block size of the sidelink data channel transmission, wherein the first slot format includes a first number of orthogonal frequency division multiplexing (OFDM) symbols available for sidelink data channel transmissions and the second slot format includes a second number of OFDM symbols available for sidelink data channel transmissions that is less than the first number of OFDM symbols to accommodate physical sidelink feedback channel resources in the second slot format; and
decoding the sidelink data channel transmission based at least in part on the transport block size of the sidelink data channel transmission, wherein the transport block size is determined based at least in part on the indication in the sidelink control information.

18. The method of claim 17, wherein the indication in the sidelink control information is an explicit indication that physical sidelink feedback channel resources within a transmission slot are to be included or excluded in determination of the transport block size.

19. The method of claim 18, wherein the explicit indication comprises one or more bits in the sidelink control information that indicate whether the physical sidelink feedback channel resources are to be included or excluded in determination of the transport block size.

20. The method of claim 17, wherein the indication in the sidelink control information is an implicit indication of whether physical sidelink feedback channel resources within a transmission slot are to be included or excluded in determination of the transport block size.

21. The method of claim 17, further comprising:
determining the transport block size based at least in part on a number of orthogonal frequency division multiplexing (OFDM) symbols within a slot that are associated with the sidelink data channel transmission, and wherein the number of OFDM symbols is determined based on the indication in the sidelink control information.

22. The method of claim 21, wherein a first value or a second value of the number of OFDM symbols is used for determining the transport block size based at least in part on the indication identifying whether one or more OFDM symbols configured to provide feedback transmissions in one or more slots are to be included or excluded when determining the transport block size.

23. An apparatus for wireless communication at a transmitting sidelink communications device, comprising:
a processor,
memory coupled with the processor; and
instructions stored in the memory and executable by the processor to cause the apparatus to:
determine a transport block size for a sidelink data channel transmission to at least a first sidelink communications device, the transport block size based at least in part on a first slot format or a second slot format of one or more slots reserved for transmission of the sidelink data channel transmission, wherein the first slot format includes a first number of orthogonal frequency division multiplexing (OFDM) symbols available for sidelink data channel transmissions and the second slot format includes a second number of OFDM symbols available for sidelink data channel transmissions that is less than the first number of OFDM symbols to accommodate physical sidelink feedback channel resources in the second slot format;

transmit, to the first sidelink communications device, sidelink control information that provides an indication that the first slot format or the second slot format is to be used for transport block size determination for the sidelink data channel transmission; and transmit the sidelink data channel transmission to the first sidelink communications device, wherein sidelink data is encoded in the sidelink data channel transmission according to the determined transport block size.

24. The apparatus of claim 23, wherein the indication in the sidelink control information is an explicit indication that physical sidelink feedback channel resources within a transmission slot are to be included or excluded at the first sidelink communications device to determination of the transport block size.

25. The apparatus of claim 24, wherein the explicit indication comprises one or more bits in the sidelink control information that indicate whether the physical sidelink feedback channel resources are to be included or excluded in determination of the transport block size.

26. The apparatus of claim 24, wherein the explicit indication is provided in first stage sidelink control information that is transmitted in a physical sidelink control channel.

27. The apparatus of claim 24, wherein a difference of three orthogonal frequency division multiplexing (OFDM) symbols within the transmission slot are used in the transport block size determination based on whether the physical sidelink feedback channel resources are included or excluded at the first sidelink communications device to determine the transport block size.

28. The apparatus of claim 24, wherein the physical sidelink feedback channel resources are excluded in determination of the transport block size when a slot for an initial sidelink data channel transmission includes physical sidelink feedback channel resources, and the physical sidelink feedback channel resources are included in determination of the transport block size when the slot for the initial sidelink data channel transmissions does not include physical sidelink feedback channel resources.

29. The apparatus of claim 24, wherein the physical sidelink feedback channel resources are excluded in determination of the transport block size when at least one slot that has resources reserved for sidelink data channel transmissions includes physical sidelink feedback channel resources, and the physical sidelink feedback channel resources are included in determination of the transport block size when all slots that have resources reserved for the sidelink data channel transmissions do not include physical sidelink feedback channel resources.

30. The apparatus of claim 23, wherein a number of orthogonal frequency division multiplexing (OFDM) symbols within the one or more slots reserved for transmission of the sidelink data channel transmission is determined based on the first slot format or the second slot format, and the transport block size is determined based at least in part on the number of OFDM symbols.

31. The apparatus of claim 30, wherein a first value or a second value of the number of OFDM symbols is used for determining the transport block size based at least in part on whether one or more OFDM symbols configured to provide feedback transmissions in the one or more slots are included or excluded when determining the transport block size.

32. The apparatus of claim 23, wherein the indication in the sidelink control information is an implicit indication of whether physical sidelink feedback channel resources within a transmission slot are to be excluded in determination of the transport block size.

33. The apparatus of claim 32, wherein the implicit indication is based on a modulation and coding scheme (MCS) used for the sidelink data channel transmission.

34. The apparatus of claim 33, wherein the physical sidelink feedback channel resources are excluded in determination of the transport block size when a coding rate of the MCS exceeds a coding rate threshold value, and the physical sidelink feedback channel resources are included in determination of the transport block size when the coding rate is at or below the coding rate threshold value.

35. The apparatus of claim 33, wherein the physical sidelink feedback channel resources are excluded in determination of the transport block size when a MCS index provided in the sidelink control information exceeds a MCS index threshold value, and the physical sidelink feedback channel resources are included in determination of the transport block size when the MCS index is at or below the MCS index threshold value.

36. The apparatus of claim 33, wherein the physical sidelink feedback channel resources are excluded in determination of the transport block size when a modulation order of the MCS exceeds a modulation order threshold value, and the physical sidelink feedback channel resources are included in determination of the transport block size when the modulation order is at or below the modulation order threshold value.

37. The apparatus of claim 33, wherein the physical sidelink feedback channel resources are excluded in determination of the transport block size when a MCS index provided in the sidelink control information is in a predetermined set of MCS index values, and the physical sidelink feedback channel resources are included in determination of the transport block size when the MCS index is outside of the predetermined set of MCS index values.

38. The apparatus of claim 32, wherein the implicit indication is based on one or more values of one or more parameters of a sidelink grant for the sidelink data channel transmission that is provided by the sidelink control information.

39. An apparatus for wireless communication at a first sidelink communications device, comprising:

a processor, memory coupled with the processor; and instructions stored in the memory and executable by the processor to cause the apparatus to:

receive, from a second sidelink communications device, sidelink control information for a sidelink data channel transmission from the second sidelink communications device, the sidelink control information including an indication of a first slot format or a second slot format for determination of a transport block size of the sidelink data channel transmission, wherein the first slot format includes a first number of orthogonal frequency division multiplexing (OFDM) symbols available for sidelink data channel transmissions and the second slot format includes a second number of OFDM symbols available for sidelink data channel transmissions that is less than the first number of OFDM symbols to accommodate physical sidelink feedback channel resources in the second slot format; and decode the sidelink data channel transmission based at least in part on the transport block size of the sidelink data channel transmission, wherein the transport block size is determined based at least in part on the indication in the sidelink control information.

40. The apparatus of claim 39, wherein the indication in the sidelink control information is an explicit indication of whether physical sidelink feedback channel resources within a transmission slot are to be used in determination of the transport block size, and comprises one or more bits in the sidelink control information that indicate whether the physical sidelink feedback channel resources are to be included or excluded in determination of the transport block size.

41. The apparatus of claim 39, wherein the indication in the sidelink control information is an implicit indication of whether physical sidelink feedback channel resources within a transmission slot are to be included or excluded in determination of the transport block size.

42. The apparatus of claim 39, further comprising:

determining the transport block size based at least in part on a number of orthogonal frequency division multiplexing (OFDM) symbols within a slot that are associated with the sidelink data channel transmission, and wherein the number of OFDM symbols is determined based on the indication in the sidelink control information.

43. The apparatus of claim 42, wherein a first value or a second value of the number of OFDM symbols is used for determining the transport block size based at least in part on the indication identifying whether one or more OFDM symbols configured to provide feedback transmissions in one or more slots are to be included or excluded when determining the transport block size.

* * * * *